United States Patent [19]

Orsic

[11] Patent Number: 4,484,324
[45] Date of Patent: Nov. 20, 1984

[54] CONTROL INFORMATION COMMUNICATION ARRANGEMENT FOR A TIME DIVISION SWITCHING SYSTEM

[75] Inventor: Milo Orsic, Lincolnwood, Ill.

[73] Assignee: AT&T Bell Laboratories, Murray Hill, N.J.

[21] Appl. No.: 410,342

[22] Filed: Aug. 23, 1982

[51] Int. Cl.³ .......................................... H04Q 11/04
[52] U.S. Cl. ................................................. 370/58
[58] Field of Search ............................. 370/58, 59, 63

[56] References Cited

U.S. PATENT DOCUMENTS

| | | | |
|---|---|---|---|
| 3,743,789 | 7/1973 | Krupp ................................. | 370/58 |
| 3,991,276 | 11/1976 | Regnier et al. ....................... | 179/15 |
| 4,201,890 | 5/1980 | Lawrence et al. ................... | 370/68 |
| 4,322,843 | 3/1982 | Beuscher et al. .................... | 370/58 |
| 4,382,294 | 5/1983 | Beuscher et al. .................... | 370/58 |
| 4,392,221 | 7/1983 | Hesketh .............................. | 370/58 |

FOREIGN PATENT DOCUMENTS

| | | | |
|---|---|---|---|
| 11153 | 5/1980 | European Pat. Off. ............. | 370/58 |
| 2014712 | 1/1980 | Fed. Rep. of Germany ........ | 370/58 |
| 102187 | 8/1981 | Japan ................................... | 370/58 |

OTHER PUBLICATIONS

J. McDonald et al., "Field Experience with a Combined Local and Toll Digital Switch", ISS 1979, May 1979, pp. 295–302.
H. Takeda et al., "Time Division Switching Control System", Rev. of Electrical Comm. Labs., Sep.–Oct. 1979, vol. 27, No. 9–10, pp. 773–782.
F. Melindo et al., "LSI Components for Digital Line Stages", CSELT Rapporti Tecnici, Oct. 1981, vol. IX, No. 5, pp. 495–500.
B. Briley et al., "A New Approach to a Reliable Time Multiplexed Switch", IEEE Trans. on Comm., May 1982, vol. COM-30, No. 5, pp. 1198–1199.

*Primary Examiner*—Douglas Olms
*Assistant Examiner*—Wellington Chin
*Attorney, Agent, or Firm*—R. T. Watland; K. H. Samples

[57] ABSTRACT

A control information communication arrangement for a time division switching system having distributed control processors. An originating processor transmits circuit setup request control words including an address defining a destination processor, to a control word switch via control time slots through a time-multiplexed switch. The control word switch responds by establishing a communication path to the destination processor via the time-multiplexed switch and then transmitting a status signal to the orginating processor indicating that the path has been established. In response to the status signal, the originating processor begins transmitting the control message control words which comprise a control message. Advantageously, the control word switch does not store entire control messages before conveying them to destination processors.

24 Claims, 20 Drawing Figures

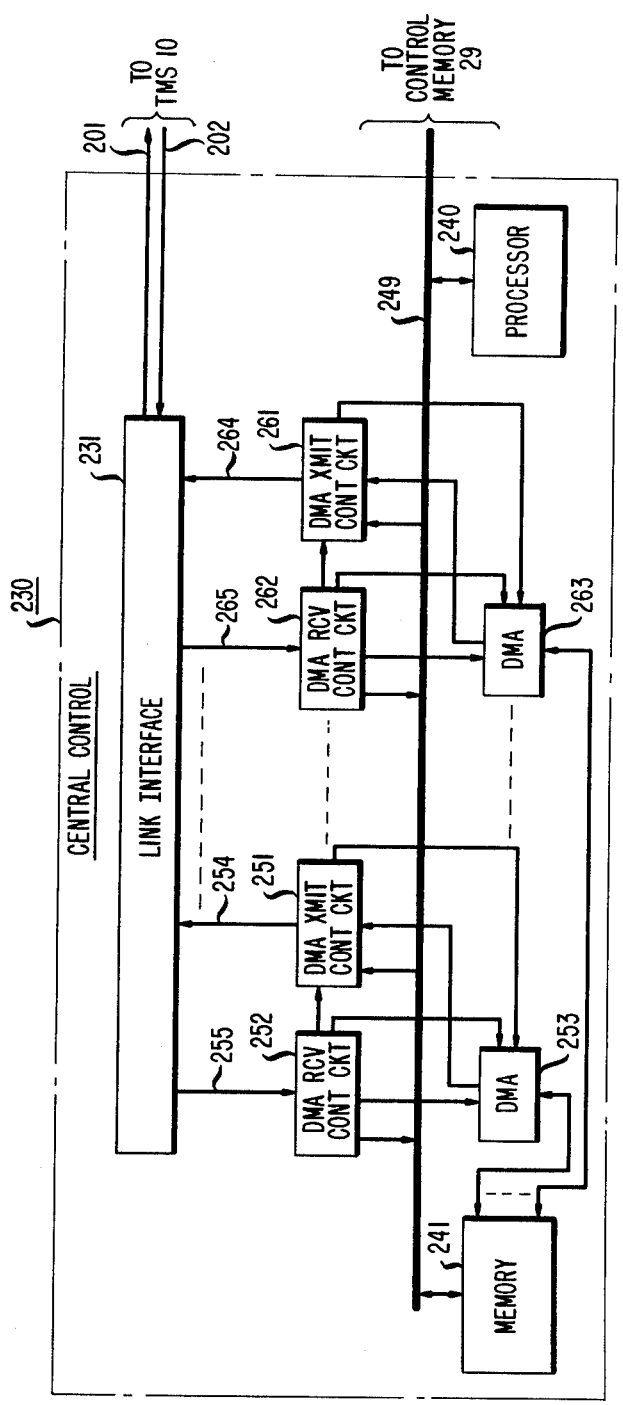

DMA TRANSMIT CONTROL CIRCUIT 701 STATE DIAGRAM

FIG. 11
CONTROL WORD FORMAT
ON INCOMING TIME-MULTIPLEXED LINE 301

| FIELD X1 INFORMATION | | | | | | | | FIELD X2 DEFINITION | | | | | | | |
|---|---|---|---|---|---|---|---|---|---|---|---|---|---|---|---|
| 0 | 1 | 2 | 3 | 4 | 5 | 6 | 7 | A | B | C | D | E | F | G | P |

| | B | C |
|---|---|---|
| CONTROL MESSAGE | 0 | 0 |
| CIRCUIT SETUP REQUEST | 0 | 1 |
| CIRCUIT CLEAR REQUEST | 1 | 0 |
| CIRCUIT DISCONNECT REQUEST | 1 | 1 |

FIG. 12
CONTROL WORD FORMAT
ON OUTGOING TIME-MULTIPLEXED LINE 302

| FIELD R1 INFORMATION | | | | | | | | | FIELD R2 STATUS TO ORIGINATING UNIT | | | | FIELD R3 STATUS TO DESTINATION UNIT | | |
|---|---|---|---|---|---|---|---|---|---|---|---|---|---|---|---|
| 0 | 1 | 2 | 3 | 4 | 5 | 6 | 7 | A | B | C | D | E | F | G | P |

| | B | C |
|---|---|---|
| CIRCUIT CLEAR | 0 | 0 |
| CIRCUIT DISCONNECT | 0 | 1 |
| CIRCUIT SET | 1 | 0 |
| CIRCUIT BUSY | 1 | 1 |

| | F | G |
|---|---|---|
| CIRCUIT CLEAR | 0 | 0 |
| CIRCUIT DISCONNECT | 0 | 1 |
| CIRCUIT SET | 1 | 0 |

| INPUT SIGNALS \ OUTPUT SIGS | MCC1 | MCC2 | MCC3 | MCC4 |
|---|---|---|---|---|
| Y=1, AA=0 | 1 | 10 | 10 | 1 |
| Y=1, AA=1 | X | 11 | XX | X |
| Z=1 | 0 | 00 | 00 | 0 |
| Z'=1 | 0 | 01 | 01 | 0 |

X = DON'T CARE

4,484,324

CONTROL INFORMATION COMMUNICATION ARRANGEMENT FOR A TIME DIVISION SWITCHING SYSTEM

TECHNICAL FIELD

This invention relates to time division switching systems and more particularly to arrangements for communicating control information within such systems.

BACKGROUND OF THE INVENTION

Stored program controlled communication switching systems comprise some form of intelligence which controls switching functions in response to a program stored in memory. Historically, such systems included a single processing entity for the control of the entire system. As technology and system design evolved, it was desirable to separate certain routine functions from the main processing entity to save its processing time for more complex system functions and decisions. Today, systems are being designed which also separate some of the more complex system functions and decisions into several intelligent processors. Throughout the evolution of switching system control strategies, changes have occurred in the way the various processing entities intercommunicate. Some systems have provided a separate controller bus structure to be used for all communications among the processors. Other systems have utilized the communication paths of the switching system to provide communication paths between the distributed system processors and a central controller which interprets control information and directs the overall operation of the switching system. These known systems, however, require that complex and time consuming operations be performed in their implementation. Further such systems cannot take full advantage of distributed processing due to their reliance on a central controller to direct the distributed processors.

A control information communication arrangement in accordance with the invention of U.S. Pat. No. 4,322,843 of H. J. Beuscher et. al. issued Mar. 30, 1982, and assigned to the assignee of the present application, achieves the benefits of interprocessor communication while reducing the complexity and time consuming nature of previous arrangements. In accordance with one exemplary embodiment of the invention of the above-cited Beuscher patent, control units intercommunicate via certain switching system communication paths by means of control messages comprising a plurality of control words. A control distribution unit included in the switching system of the exemplary embodiment accumulates the control words of a control message being transmitted by one of the control units and, after the entire control message has been stored, the message is routed to the control unit defined by an address portion of the message when a communication path to that control unit becomes available. However, since the control distribution unit in the exemplary embodiment stores the entire control message, interprocessor communications can be significantly delayed when control messages comprise many control words. Further, since a given control unit may sequentially transmit a number of control messages, all of which must be stored in the control distribution unit of the exemplary embodiment because of the lack of available communication paths to destination control units, the magnitude of the storage facilities included in the control distribution unit must be large. Further, the possibility that transmitted control messages may be lost when the provided storage facilities are all being used to store other control messages complicates the fault recovery procedures that must be developed to assure high system reliability. In view of the foregoing, a recognized problem in the art is achieving the benefits of interprocessor communication using the communication paths of a switching system in accordance with the invention of the above-cited Beuscher patent without unnecessarily delaying the interprocessor communication and without the cost and complexity associated with the storage facilities of the above-described exemplary embodiment.

SUMMARY OF THE INVENTION

The aforementioned problem is advantageously solved and a technical advance is achieved in accordance with the principles of the invention in a control information communication arrangement wherein a given control unit desiring to transmit a control message comprising a number of control words to a destination control unit must first transmit a circuit setup request control word defining the destination control unit to a switching means and wherein the switching means responds to the circuit setup request control word by establishing a communication path to the destination control unit whereby the control words of the control message are conveyed from the given control unit to the destination control unit without being accumulated and stored therebetween. In accordance with a second aspect of the invention, the given control unit begins to transmit the control message only after being informed that the communication path to the destination control unit has been established.

A control information communication arrangement for a time division switching system in accordance with the present invention comprises a switching means having input ports and output ports and a plurality of control units each connected to at least one of the input ports for transmitting circuit setup request control words each having an address portion defining one of the control units and for sequentially transmitting control messages control words. Each of the control units is also connected to at least one of the output ports for receiving control message control words. The switching means includes a control word routing circuit and means for transmitting circuit setup request control words and sequentially transmitting control message control words from the input ports connected to the control units, to the control word routing circuit. The control word routing circuit comprises a receiver which receives circuit setup request control words and control message control words and a circuit which responds to a given circuit setup request control word from a given input port by transmitting each control message control word received sequentially from the given input port, to one of the output ports connected to the control unit defined by the address portion of the given circuit setup request control word before the next control message control word is received from the given input port.

BRIEF DESCRIPTION OF THE DRAWING

A more complete understanding of the present invention may be obtained from a consideration of the following description when read in conjunction with the drawing in which:

FIG. 7 is a more detailed diagram of a central control included in the embodiment of FIG. 1;

FIG. 11 is a diagram of the control word format used for control words transmitted to a control word switch included in the embodiment of FIG. 1;

FIG. 12 is a diagram of the control word format used for control words transmitted from the control word switch included in the embodiment of FIG. 1;

GENERAL DESCRIPTION

Figure 1:
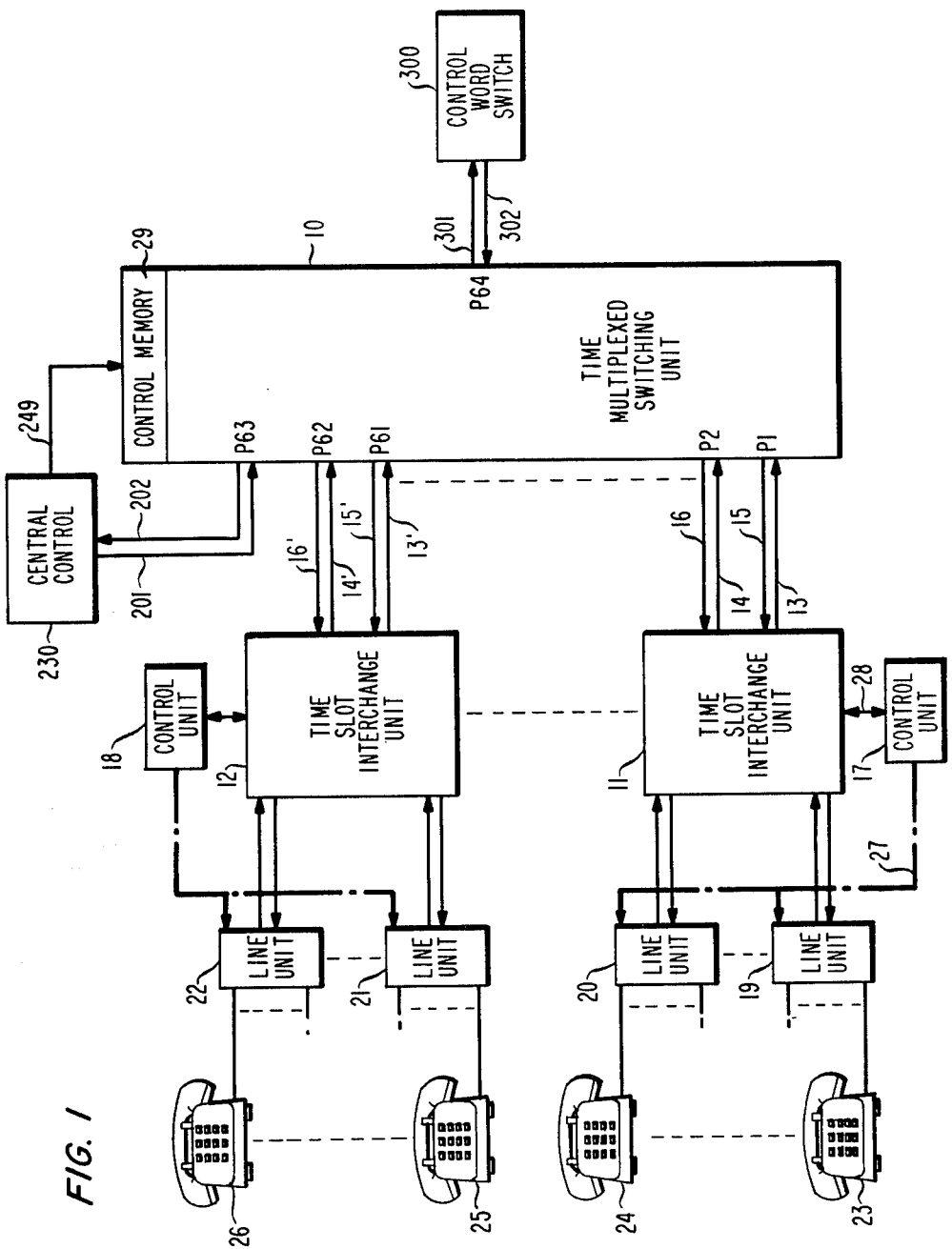
FIG. 1 is a block diagram of a system embodying the present invention.

FIG. 1 is a block diagram of a time division switching system embodying the present invention which is used to interconnect subscriber sets such as subscriber sets 23 through 26. The embodiment of FIG. 1 includes a time-multiplexed switching unit 10 which comprises a time-shared space division switch having 64 input ports and 64 output ports. The embodiment further includes 31 time-slot interchange units of which representative time-slot interchange units 11 and 12 are specifically shown. Each time-slot interchange unit 11 and 12 includes a bidirectional time-slot interchange. Additionally, each time-slot interchange unit 11 and 12 is connected to two input ports and two output pots of time-multiplexed switch unit 10. In the present embodiment, time-slot interchange unit 11 is connected to two time-multiplexed switch input ports via time-multiplexed lines 13 and 14 and to two output ports, via time-multiplexed lines 15 and 16. Time-slot interchange unit 12 is connected to two time-multiplexed switch input ports via time-multiplexed lines 13' and 14' and to two output ports, via time-multiplexed lines 15' and 16'.

In the description which follows, the input and output ports of time-multiplexed switching unit 10 are referred to as input/output port pairs. This term is used since the source for data words to an input port of a given input/output port pair is also the destination for data words from the output port of that pair. As shown in FIG. 1, input/output port pair P1 is associated with time-multiplexed lines 13 and 15. Each time-multiplexed line 13 through 16 and 13' through 16' conveys digital information in 125-microsecond frames each comprising 256 time separated channels. Accordingly, each time-slot interchange unit transmits and receives up to 512 channels of digital information during each 125-microsecond frame.

Each time-slot interchange unit is uniquely associated with a control unit of which control unit 17 is associated with time-slot interchange unit 11, and control unit 18 is associated with time-slot interchange unit 12. Additionally, each time-slot interchange unit is connected to a plurality of line units of which line units 19 through 22 are shown in FIG. 1 via individual time-multiplexed lines. In the present embodiment line units 19 and 20 are connected to time-slot interchange unit 11 and line units 21 and 22 are connected to time-slot interchange unit 12. Each of the line units of the present embodiment is connected to a number of subscriber sets of which subscriber sets 23 through 26 are shown. The exact number of line units associated with each time-slot interchange unit and the exact number of subscriber sets associated with each line unit is determined by the number of subscribers to be served and the calling rates of those subscribers. Each line unit terminates the analog loop of the well-known type from a plurality of subscriber sets, e.g., 23 through 26, and converts call information including analog speech signals into digital data words which are transmitted to its associated time-slot interchange unit. Further, each line unit detects service requests from the subscriber sets and generates certain signaling information for those subscriber sets. The particular subscriber sets from which speech samples are taken and encoded, and the particular time-multiplexed channels used to transmit the resulting code between the line unit and its associated time-slot interchange unit are determined by the control unit of the associated time-slot interchange unit.

The relationship of subscriber sets, line units and time-slot interchange units is substantially the same for each of such groups of interconnected units. Accordingly, while the description which follows relates directly to subscriber set 23, line unit 19 and time-slot interchange unit 11, it shows the relationships for all other groups of such units. Line unit 19 scans the lines connected to each subscriber set to detect requests for service. When such a request is detected, line unit 19 transmits to the control unit 17, a message indicating the request and the identity of the requesting subscriber set. This message is transmitted to control unit 17 via a communication path 27. Control unit 17 performs the necessary translation based on the service requested, the identity of the requesting subscriber set and the available equipment, and transmits a message to line unit 19 via communication path 27 defining which of the plurality of time-separated channels between line unit 19 and time-slot interchange unit 11 is to be used to transmit information from subscriber set 23 to time-slot interchange unit 11. Based on this message, line unit 19 encodes the analog information from subscriber set 23 into digital data words and transmits the resulting data words in the assigned channels. In the present embodiment, line unit 19 also transmits in the assigned channel an indication of the DC state, i.e., open circuit, closed circuit, of the subscriber loop associated with subscriber set 23.

After a time separated channel between line unit 19 and time-slot interchange unit 11 is assigned to a given subscriber set, control unit 17 detects signaling information from the subscriber set by sampling the information transmitted in the assigned channel. Such sampling operations are performed via a communication path 28. Control unit 17 responds to the signaling information from the subscriber's channel, and to control messages from other control units, e.g., 18, and a central control 230, by controlling the time-slot interchange function of the time-slot interchange unit 11. As previously stated, each time-multiplexed line between a time-slot interchange unit and the time-multiplexed switch unit 10 has 256 channels each 125-microsecond frame. These channels are assigned numerical designations from 1 to 256 in sequence as they occur. This sequence of channels recurs so that a given channel will be available every 125 microseconds. The time-slot interchange function takes the data words received from the line units and places them in channels on the time-multiplexed line between the time-slot interchange units and the time-multiplexed switching unit 10 under the control of control units 17 and 18.

Time-multiplexed switching unit 10 operates in recurring frames of time slots where each 125-microsecond frame comprises 256 time slots. During each time slot, time-multiplexed switching unit 10 is capable of connecting data words received at any of its 64 input ports to any of its 64 output ports in accordance with time-slot control information stored in a control memory 29. The configuration pattern of connections through time-multiplexed switching unit 10 repeats itself every 256 time slots and each time slot is assigned a numerical designation in sequence from 1 to 256. Accordingly, during a first time slot TS 1 the information in channel 1 on time-multiplexed line 13 may be switched by time-multiplexed switching unit 10 to an output port P64 while during the next time slot TS 2 channel 2 on time-multiplexed line 13 may be switched to an output port P62. Time-slot control information is written into control memory 29 by a central control 230 which derives this control information from control messages obtained from various control units, e.g., 17 and 18.

Central control 230 and the control units 17 and 18 exchange control messages utilizing selected channels called control channels of the time-multiplexed lines, e.g., 13 through 16, between the time-slot interchange units and the time-multiplexed switching unit 10. In the present embodiment, each control message comprises a plurality of control words and each control channel can transmit one control word per frame of 256 time separated channels. The same channel of the two time-multiplexed lines associated with a given input/output port pair is predefined to be a control channel. Additionally, a given channel is used as a control channel for only one pair of time-multiplexed lines. For example, if channel 1 is used as a control channel on time-multiplexed line 13 and the associated time-multiplexed line 15, no other time-multiplexed line will use channel 1 as a control channel. In accordance with the present example, input/output port pairs P1 through P62 are connected to the 31 time-slot interchange units. Control unit 17, which is associated with time-slot interchange unit 11 uses channel 1 of time-multiplexed lines 13 and 15 connected to input/output port pair P1 and channel 2 of time-multiplexed lines 14 and 16 connected to input/output port pair P2 as control channels. Similarly, the control units associated with the other 30 time-slot interchange units are channels 3 through 62 of the time-multiplexed lines connected to input/output port pairs P3 through P62. For example, control unit 18 which is associated with time-slot interchange unit 12, uses channel 61 of time-multiplexed lines 13' and 15' connected to input/output port pair P61 and channel 62 of time-multiplexed lines 14' and 16' connected to input/output port pair P62 as control channels. Input/output port pair P63 is connected to central control 230 via time-multiplexed lines 201 and 202. Central control 230 uses nine channels, channels 63 through 71, of time-multiplexed lines 201 and 202 as control channels. The number of control channels used by the central control is determined by the amount of control message traffic in a particular embodiment.

During each time slot having the same numerical designation as a control channel, time-multiplexed switching unit 10 connects the control word occupying that control channel to output port P64 and connects input port P64 to the output port associated with the above-mentioned control channel. The following is an example of the operation of the present embodiment when channel 1 is the control channel for time-multiplexed lines 13 and 15, and channel 2 is the control channel for time-multiplexed lines 14 and 16. During time slot TS 1 information from control memory 29 defines, among other connections, that the control word in channel 1 of time-multiplexed line 13 is connected to output port P64 and that the control word in channel 1 at input port P64 is connected to time-multiplexed line 15. Similarly, during time slot TS 2, information from control memory 29 defines that the control word in channel 2 of time-multiplexed line 14 is connected to output port P64 and that the control word in channel 2 at input port P64 is connected to time-multiplexed line 16. When operating in this manner, output port 64 receives from time-multiplexed switching unit 10 all control words in a channel having the same numerical designation in which they were transmitted to the time-multiplexed switch. Further, each control channel is connected to receive control words from input port P64 during the time slot having the same numerical designation as their associated control channel. Control words switched to output port P64 are transmitted to control word switch 300 on a 256-channel time-multiplexed line 301. Accordingly, the 71 control channels of the present embodiment (62 channels used by the control units associated with the 31 time-slot interchange units and nine channels used by central control 230) are routed in channels 1 through 71 of time-multiplexed line 301. The control words transmitted on time-multiplexed line 301 each comprise 16 bits in the format shown in FIG. 11, bits 0 through 7 comprising an 8-bit information field X1 and bits B and C comprising a 2-bit definition field X2. Field X2 of a given control word defines that control word as a control message control word, a circuit setup request control word, a circuit clear request control word or a circuit disconnect request control word. Control words received by control word switch 300 on time-multiplexed line 301 are routed, in a manner to be described herein, in channels 1 through 71 of a 256-channel time-multiplexed line 302 connected to input port P64.

(Channels 72 through 256 of time-multiplexed lines 301 and 302 are unused in the present example). The control words transmitted on time-multiplexed line 302 each comprise 16 bits in the format shown in FIG. 12, bits 0 through 7 comprising an 8-bit information field R1, bits B and C comprising a 2-bit status field R2 and bits F and G comprising a 2-bit status field R3. Status field R2 is used to convey status signals to time-slot interchange units originating control messages and status field R3 is used to convey status signals to time-slot interchange units receiving control messages. By the operation of time-multiplexed switching unit 10, channels 1 through 62 of time-multiplexed line 302 are rounted in channels 1 through 62 respectively at output ports P1 through P62 and channels 63 through 71 of time-multiplexed line 302 are routed in channels 63 through 71 at output port P63.

The use of control channels through time-multiplexed switching unit 10 and control word switch 300 to convey control messages is illustrated by the following example wherein control unit 17 associated with time-slot interchange unit 11 desires to transmit a control message to control unit 18 associated with time-slot interchange unit 12. First, time-slot interchange unit 11 transmits a circuit setup request control word, defined as such by having its definition field X2=01, in time slot TS 1 of time-multiplexed line 13. The circuit setup request control word includes in its information field X1 the binary equivalent of 61 which is the number of the control channel to be used for the control communication to time-slot interchange unit 12. By the operation of time-multiplexed switching unit 10, the circuit setup request control word is transmitted via output port P64 in time-slot TS 1 on time-multiplexed line 301 to control word switch 300. Control word switch 300 determines by means to be described herein whether control channel 61 to time-slot interchange unit 12 is available. If that channel is busy, control word source 300 transmits a circuit busy status signal to time-slot interchange unit 11 by including status field R2=11 in the next control word transmitted in time slot TS 1 on time-multiplexed line 302, that word, in turn, being transmitted in time-slot TS 1 on time-multiplexed line 15. In response to the circuit busy status signal, time-slot interchange unit 11 repetitively transmits in channel 1 of time-multiplexed line 13 circuit setup request control words defining control channel 61 until control word switch 300 determines that control channel 61 to time-slot interchange unit 12 is idle, at which time the binary equivalent of 61 is stored in a memory location of control word switch 300 associated with channel 1 of time-multiplexed line 301 and circuit set status signals are transmitted to both time-slot interchange units 11 and 12. Control word switch 300 transmits these circuit set status signals by including status field R2=10 in the next control word transmitted in time slot TS 1 and including status field R3=10 in the next control word transmitted in time slot TS 61, both on time-multiplexed line 302. In response to the circuit set status signal received by time-slot interchange unit 12, associated control unit 18 is informed that the control message control words comprising a control message will be received in the control channel 61 at the rate of one control word per frame. Time-slot interchange unit 11, in response to the circuit set status signal from control word switch 300, begins transmitting the control message control words comprising the control message at the rate of one control word per frame in control channel 1. Control word switch 300 uses the information stored in the memory location associated with control channel 1 to route each control message control word received in channel 1 on time-multiplexed 301 to channel 61 on time-multiplexed line 302. The control message is thereby conveyed from control unit 17 to control word switch 300 via control channel 1 and from control word switch 300 to control unit 18 via control channel 61. Although the example described herein involved control message communication between two of the control units associated with time-slot interchange units, a substantially identical procedure is used for control message communication between a control unit associated with a time-slot interchange unit and central control 230.

Each of the control units, e.g., 17 and 18, includes a memory 57 (FIG. 3) which stores the program for the control of its associated control unit and data regarding the primary function of the control unit, its associated time-slot interchange unit and its associated subscribers. Memory 57 stores such information as class of service, the subscriber limits for gain or attenuation, toll screening information, and information relating to changes in normal call handling procedures, e.g., terminating party hold or joint hold. Much of the contents of the given memory 57 is not stored in memory locations associated with any other control unit or the central control. It may, however, be stored in a bulk memory (not shown) for maintenance purposes. Some of the information in memory 57 e.g., terminating party or joint hold information, relates primarily to functions performed by other control units. This information is stored in association with the subscriber to which it relates to avoid data replication and to avoid the inefficiencies of centralized storage of such information. The previously described arrangement utilizing control channels transmitted through control word switch 300 is utilized to send this call related information to other control units and the central control.

DETAILED DESCRIPTION

Line Unit 19

Figure 2:
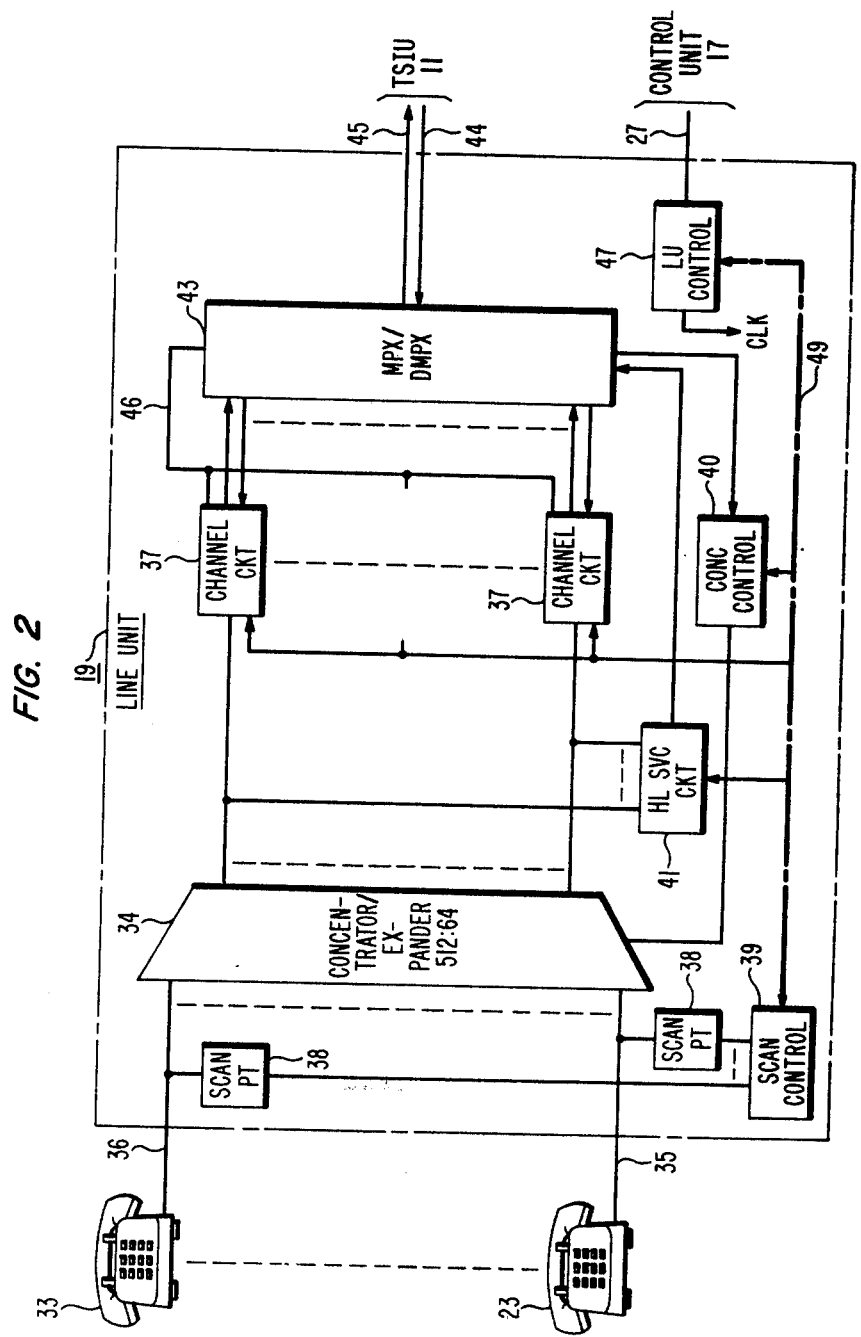
FIG. 2 is a more detailed diagram of a line unit included in the embodiment of FIG. 1.
Figure 6:
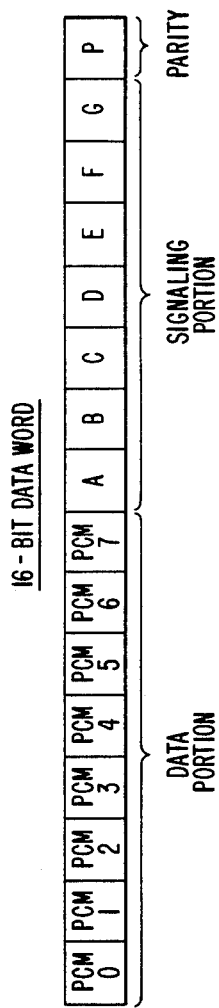
FIG. 6 is a diagram of the data word format utilized in the embodiment of FIG. 1.

Line unit 19 is shown in greater detail in FIG. 2. It should be noted that all of the line units of the present embodiment are substantially identical to line unit 19. Up to 512 subscriber sets, such as subscriber sets 23 and 33, can be connected to each line unit of the present embodiment. These subscriber sets are connected to a concentrator/expander 34 via subscriber loop circuits of a type well known in the art. Subscriber set 23 is connected to concentrator/expander 34 via subscriber loop circuit 35 and subscriber set 33 is connected to concentrator/expander 34 via subscriber loop circuit 36. Concentrator/expander 34 has 512 input terminals and 64 output terminals thus providing 8 to 1 concentration and expansion. The present embodiment also includes 64 channel circuits 37 which convert analog information from the subscriber sets into digital data words before transmission to the switching system, and which convert digital information from the switching system back to analog form for transmission to the subscriber sets. Each of the channel circuits 37 is connected to one of the output terminals of concentrator/expander 34. Each of the output ports of concentrator/expander 34 is also connected to a high-level service circuit 41 which is used, for example, to provide ringing current to the subscriber sets. Each of the channel circuits 37 samples the analog signals from its associated output terminal of concentrator/expander 34 at an 8-kilohertz rate and converts those samples to 8-bit PCM representations of the analog samples. This 8-bit PCM representation is used as a part of the data word transmitted to the time-slot interchange unit 11. Each data word as shown in FIG. 6 is 16 bits in length and comprises an 8-bit PCM data portion, a 7-bit signaling portion, and a parity bit. The signaling portion is used to convey signaling information about the channel circuit or the subscriber set to which it is connected. For example, the A-bit of the signaling portion is used to transmit the present DC state of the associated subscriber set to the time-slot interchange unit 11.

The data words are transmitted from the channel circuit 37 to a multiplex/demultiplex circuit 43 which is connected to transmit and receive time-multiplexed digital information to and from time-slot interchange unit 11. Multiplex/demultiplex circuit 43 transmits digital information to time-slot interchange unit 11 on time-multiplexed line 45 in 125 microsecond frames each comprising 64 channels of 16 bits each. Each channel transmitted on time-multiplexed line 45 is uniquely associated with one of the channel circuits 37 and is used to convey information from that channel circuit to the time-slot interchange unit 11. Multiplex/demultiplex circuit 43 operates in the manner well known in the art to transmit the 16-bit data words from each of the channel circuits 37. Multiplex/demultiplex circuit 43 receives digital information from the time-slot interchange unit 11 via a time-multiplexed line 44 in a format substantially identical to the format on time-multiplexed line 45. When operating as a demultiplexer, multiplex/demultiplex circuit 43 transmits the data word received in each channel on time-mutliplexed line 44 to the one of channel circuits 37 uniquely associated with that channel. The particular channel circuit 37 which is to receive the channel is determined by the position of that channel within a frame of such channels. The channel circuit 37 then decodes the 8-bit PCM data word and transmits the resulting analog signal to its associated subscriber via concentrator/expander 34. Multiplex/demultiplex circuit 43 also includes a clock regeneration circuit (not shown) which generates clock signals from the signals on time-multiplexed line 44 in a manner well known in the art. These clock signals are used to control timing in the multiplex/demultiplex circuit 43 and transmitted via a conductor 46 to the channel circuits 37 to control the timing thereof.

As previously stated, control unit 17 controls many of the operations performed by each of the line units. The main processing entity of control unit 17 is a processor 66 (FIG. 3) which operates in response to instructions stored in memory 57. Control unit 17 also includes a control interface circuit 56 which receives instructions from processor 66 via a bus 59 and in response thereto, communicates with the line units, e.g., 19 and 20 via the control bus 27. Control bus 27 comprises a plurality of communication paths at least one of which is uniquely associated with each line unit. Each line unit includes a line unit controller which is connected to the control bus 27. In the present embodiment, line unit 19 includes a line unit controller 47 (FIG. 2). Most communication between control unit 17 and line unit controller 47 is initiated by read or write orders from control unit 17. A read order is a direction to read some identifiable information in line unit 19 and comprises a single bit read indication and the address of the particular information to be read. A write order is a direction to write information into some unit in line unit 19 and comprises a write address, the information to be written, and a 1-bit write code. The particular unit to be written into or read from may be the scan controller 39, the concentrator controller 40 or the high-level service circuit 41. Line unit controller 47 partially decodes each order from control unit 17 and directs the remainder of the order and the read/write indicator bit to the particular unit addressed. The particular unit addressed responds to the address portion transmitted from control unit 17 and the read/write bit by reading or writing the storage location identified by the address portion. The information read from a particular unit in line unit 19 is returned to line unit controller 47 and transmitted thereby to control unit 17.

Each subscriber loop, e.g., 35 and 36, includes a scan point 38 which indicates the DC conduction state of its associated subscriber loop. Control unit 17 periodically scans the subscriber loops associated with the subscriber sets of the switching system by transmitting to the line units of FIG. 1 read orders defining a number of scan points to be read. In the present embodiment such a scan order is received by line unit controller 47 which transmits the address and read/write bit portions of the order to scan control unit 39. The scan control unit 39 formulates a reply for control unit 17 which consists of the present DC conduction state of the subscriber loops indicated by ones of scan points 38 identified in the address portion. Control unit 17 checks the information transmitted from scan control unit 39 to determine if any of the subscriber sets have changed state. If, for example, one of the subscriber sets has gone off-hook since the last scan, it is necessary to provide a communication path from that subscriber set through concentrator/expander 34 to an available one of channel circuits 37. Accordingly, control unit 17 transmits a write order to concentrator control circuit 40 which responds thereto by connecting a subscriber set, e.g., subscriber set 33, to a predefined output terminal of concentrator/expander 34. No reply is required in response to a write order, however, it may be found that the return of an all-seems-well signal to control unit 17 will aid in maintaining the "sanity" of the overall system.

Time Slot Interchange Unit 11

As previously stated, the output signals of multiplex/demultiplex circuit 43 consist of recurring frames each comprising 64 digital channels of 16 bits each. This information is transmitted to a multiplex unit 60 (FIG. 3) within time-slot interchange unit 11. Multiplex circuit 60 receives the output signals from eight line units which signals are reformatted and transmitted on an output time-multiplexed line 62 having 512 channels for each 125-microsecond frame. Similarly, a demultiplex circuit 61 receives 512 channels of 16 bits each on a time-multiplexed line 63 which channels are distributed in a predetermined arrangement to eight line units such as line unit 19. Further, multiplex unit 60 converts incoming channels of information from serial to parallel form and demultiplexer 61 converts the information it receives from parallel to serial form. The information transmitted in a given channel on time-multiplexed line 62 is stored in a receive time-slot interchange 50 in a memory location uniquely associated with that given channel.

The particular memory location into which a given data word is stored is defined by time-slot designation signals generated by time-slot counter 54. Time-slot counter 54 generates a recurring sequence of 512 time-slot designations at the rate of one time-slot designation per time slot. The particular time-slot designation generated during the time slot in which a given data word is received defines the memory location within receive time-slot interchange 50 which is to store that data word. Data words are also read from receive time-slot interchange 50 at the rate of one data word per time slot. The memory address of the data word to be read from receive time-slot interchange 50 during a given time slot is obtained by reading control RAM 55. Control RAM 55 is read once per time slot at an address defined by the time-slot designation from time-slot counter 54 and the quantity so read is transmitted to receive time-slot interchange 50 as the read address for that time slot. Data words read from receive time-slot interchange 50 are transmitted to time-multiplexed switch 10 via a time-multiplexed line 68 and an interface unit 69. Data words from time-multiplexed switch unit 10 are received by time-slot interchange unit 11 via the interface unit 69 and are applied to time-multiplexed line 70. Time-multiplexed line 70 is connected to transmit time-slot interchange 53 which stores the incoming data words in a location defined by an address from control RAM 55. Data words are read from transmit time-slot interchange 53 at the address defined by the time-slot counter 54. Data words so read are transmitted on time-multiplexed line 63 for transmission to the line unit 19. It should be noted that control RAM 55 may be implemented as a number of control memories each associated with a particular circuit, e.g., transmit time-slot interchnge 53. The particular configuration of control memories is not important to the present invention and may vary depending on timing and circuitry requirements within the time-slot interchange unit 11. The general principles of time-slot interchange as performed by the receive time-slot interchange 50, the control RAM 55, the time-slot counter 54 and the transmit time-slot interchange 53 are well known in the art and are not described in greater detail herein. One arrangement for reading and writing data words in time-slot memories is described in detail in U.S. Pat. No. 4,035,584, J. W. Lurtz.

Figure 3:
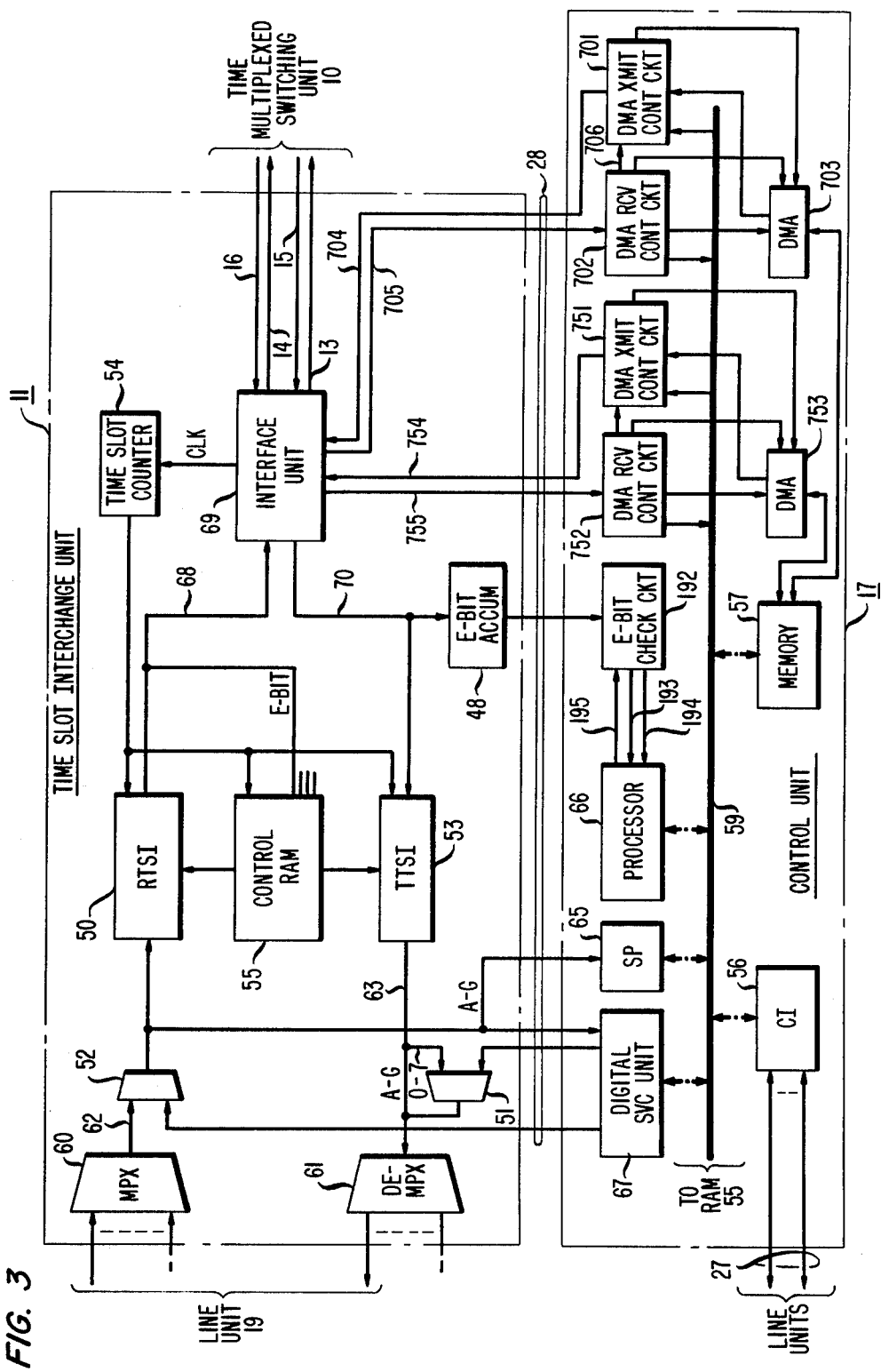
FIG. 3 is a more detailed diagram of a time-slot interchange unit and an associated control unit included in the embodiment of FIG. 1.

Each data word on time-multiplexed line 62 is stored in time-slot interchange 50 as above described. In addition to storage in time-slot interchange 50 the signaling portion (bits A through G, FIG. 6) of each data word received by time-slot interchange unit 11 is transmitted to a signal processor 65 which is a part of control unit 17 (FIG. 3). Signal processor 65 reduces the real time load requirement of processor 66 by receiving and analyzing bits A through G. For example, signal processor 65 analyzes the A-bit of each data word, which bit indicates the DC state of associated subscriber set, to determine if a subscriber set has gone on-hook or if a valid dial pulse has been sent. When an on-hook status or a dial pulse is detected, the signal processor 65 transmits to processor 66 a signal indicating the information obtained. Processor 66 accumulates the information from signal processor 65 and responds by exercising control over the switching system in a manner to be described in greater detail later herein.

The embodiment of FIG. 3 also includes a digital service unit 67 which receives the data portion (FIG. 6) of each data word transmitted on time-multiplexed line 62. Digital service unit 67 is used primarily to receive and analyze tone signals from the subscribers which have been converted by a channel circuit 37 into PCM signals and to transmit tones and signals in PCM format. Digital service unit 67 comprises a memory (not shown) which has at least 65 storage locations to receive data portions of data words from time-multiplexed line 62. The data portion of each data word read from time-multiplexed line 62 is written into a location of digital service unit 67 defined by an address read from control RAM 55. Only 64 channels can be actively transmitting information to be utilized by the digital service unit 67. The data words from all other channels are written into the 65th memory location of digital service unit 67 where they are ignored. Digital service unit 67 reads the data words so stored, determines what signals are being received and communicates the identity and nature of those signals to processor 66. Processor 66 determines what action should be taken in response to the received signals.

Digital service unit 67 also transmits tones to the subscriber sets via time-multiplexed line 63 in the channel associated with that subscriber set. These tones, in PCM form, are transmitted from digital service unit 67 to a first input port of a gating circuit 51 during the time slot associated with the receiving subscriber. The other input port of gating circuit 51 is connected to receive the data portion of each data word read from transmit time-slot interchange 53. A gate control bit is read from control RAM 55 and transmitted to gate circuit 51 during each time slot to define that either the data portion from transmit time-slot interchange 53 or the data portion from digital service circuit 67 is to be transmitted to demultiplexer 61. In the present embodiment a logical "1" gating bit defines the digital service unit 67 as the source of the data portion and a logical "0" defines transmit time-slot interchange 53 as the source.

In addition to transmitting PCM encoded tones to its associated line unit, each time-slot interchange unit can transmit such tones toward time-multiplexed switch unit 10. This ability exists since, as described in greater detail later herein, audible ring tone for an originating subscriber is generated in the time-slot interchange unit associated with the terminating subscriber. The incoming time-multiplexed line 62 is connected as one input to a gating circuit 52 which is the point of insertion for tones to be transmitted toward time-multiplexed switch unit 10. The other input of gating circuit 52 is connected to an output terminal of the digital service unit 67. Gating circuit 52 and digital service unit 67 operate in the manner previously described with respect to gating circuit 51, to place tones in predefined ones of the time-multiplexed channels on time-multiplexed line 62.

The PCM encoded representations of a given tone to be transmitted toward time-multiplexed switch 10 are placed in the same channel of time-multiplexed line 62 and are, accordingly, stored in the same addressable location of receive time-slot interchange 50. In order to apply these tones to a given channel on outgoing time-multiplexed line 68, control RAM 55 is controlled by processor 66 to generate the read address of the tone storing addressable location during the time slot associated with that channel. For example, audible ring tones may be placed in channel 512 of time-multiplexed line 62 resulting in their storage in the 512th addressable location of receive time-slot interchange 50. Whenever time-slot interchange unit 11 is to transmit audible ring tone in a given channel, processor 66 places the address 512 in the time-slot location of control RAM 55 associated with that given channel. Accordingly, each occurrence of the given channel will receive a PCM representation of audible ringing. When audible ringing is to terminate, processor 66 changes the address stored by control RAM 55 at the time-slot location associated with the given channel.

The following is a description of the interaction of signal processor 65, processor 66, and digital service unit 67. It is assumed for this description that a subscriber utilizing tone dialing has gone off-hook, and has been assigned to a channel circuit in the manner previously described with regard to line unit 19. After a channel circuit has been assigned, supervision is transferred to digital service unit 67 and signal processor 65. By reading the signaling portion of the data word in the assigned channel, signal processor 65 monitors the DC state of the subscriber set and communicates any changes to processor 66. Further, processor 66 via bus 59 writes a logical "1" into the gating bit position of control RAM 55 associated with gating circuit 51 in the time slot of the channel associated with the newly off-hook subscriber. This defines that the output signals from digital service unit 67 are to be transmitted to demultiplexer 61 via gating circuit 51 during the time slot associated with the newly off-hook subscriber. Additionally, processor 66, via bus 59, instructs digital service unit 67 to read from its internal storage the PCM representation of dial tone during the time slot associated with the newly off-hook subscriber. Accordingly, the dial tone is transmitted to demultiplexer 61 in the channel associated with the newly off-hook subscriber. Processor 66 also instructs digital service unit 67 to accumulate the data portion of each channel on time-multiplexed line 62 which is associated with the newly off-hook subscriber. In this manner dialed digits will be detected by digital service unit 67. Information regarding dialed digits and DC status of the particular subscriber set is transmitted to processor 66 which terminates the transmission of dial tone and continues to accumulate dialed digits.

Control Information Communication

Figure 8:
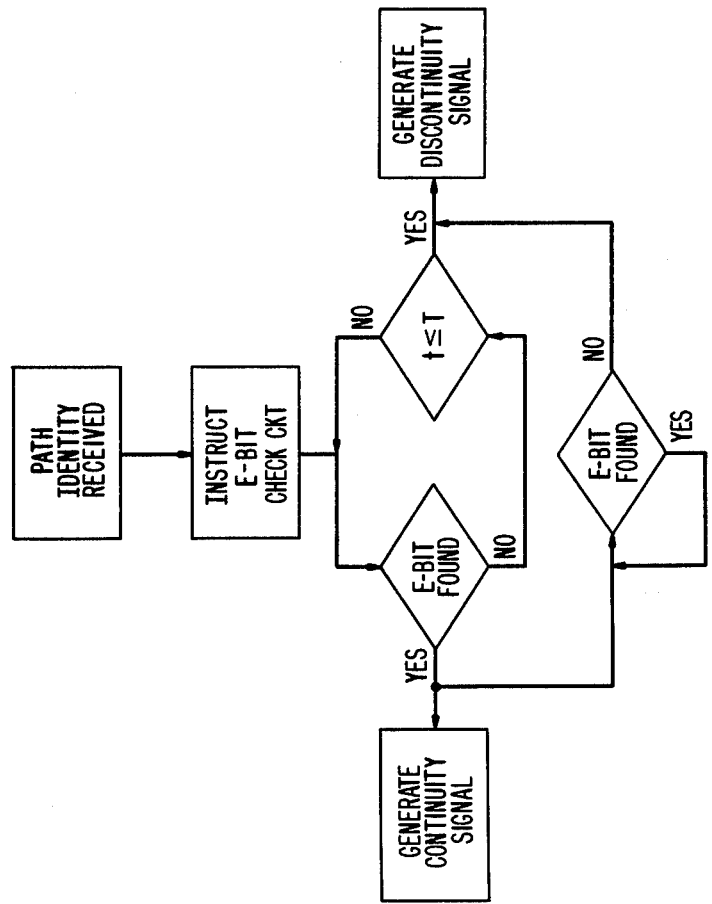
FIG. 8 is a flow diagram of an E-bit control sequence of the present embodiment.

The primary mode of control information exchange in the present embodiment comprises the transmission of control messages from a source time-slot interchange unit through time-multiplexed switch 10, control word switch 300 and back through time-multiplexed switch 10 to a destination time-slot interchange unit or to central control 230. The primary mode of control information exchange also includes the transmission of control messages from central control 230 through time-multiplexed switch 10, control word switch 300 and back through time-multiplexed switch 10 to a destination time-slot interchange unit. A secondary mode of communication is also used whereby control information with regard to a given call is transmitted from the source time-slot interchange unit to the destination time-slot interchange unit via time-multiplexed switch 10 utilizing the time slot assigned for that call. In the present embodiment, the E-bit position of the data word in the call time slot is used for the secondary mode communication. However, it can be seen that any or all of the signaling bits could be used in this secondary communication mode. In the present embodiment, the E-bit serves the dual purposes of communication path continuity check and signal acknowledgment. Control RAM 55 includes an E-bit position in each of its 512 storage locations. During the course of a call, processor 66 controls the digit stored in the E-bit position of each storage location of control RAM 55 associated with the call. As control RAM 55 transmits addresses defining data words to be read from receive time-slot interchange 50, it transmits the stored E-bit on time-multiplexed line 68 in place of the E-bit stored in receive time-slot interchange 50. This allows the transmission of messages utilizing the E-bit channel between time-slot interchange units. The arrangement in FIG. 3 also includes an E-bit accumulator 48 which receives the E-bit of each data word received on time-multiplexed line 70. These E-bits are transmitted to an E-bit check circuit 192 by E-bit accumulator 48. E-bit check circuit 192 responds to instructions from processor 66 on conductor 195 to transmit output signals relating to the E-bits of selected data words to processor 66. For example, during communication path establishment, processor 66 instructs E-bit check circuit 192 to survey the E-bit position of a particular channel and to notify processor 66 if a logical "1" is received within a predetermined period of time. FIG. 8 is a flow diagram of the function performed by E-bit check circuit 192. When no logical "1" E-bit is found in the specified channel within the predetermined period of time, a discontinuity signal indicating this fact is transmitted to processor 66 via conductor 193. Alternatively, when such a logical "1" is found by E-bit check circuit 192 within the time period, a continuity signal is transmitted to processor 66 via conductor 194. The E-bit check circuit 192 also surveys the E-bit of each active call. When the E-bit of an active call becomes a logical "0" and stays such for a fixed period of time, the above-mentioned discontinuity signal is transmitted to its associated processor 66. Any processor 66 receiving a discontinuity signal transmits a control message to central control 230 indicating this fact.

Figure 9:
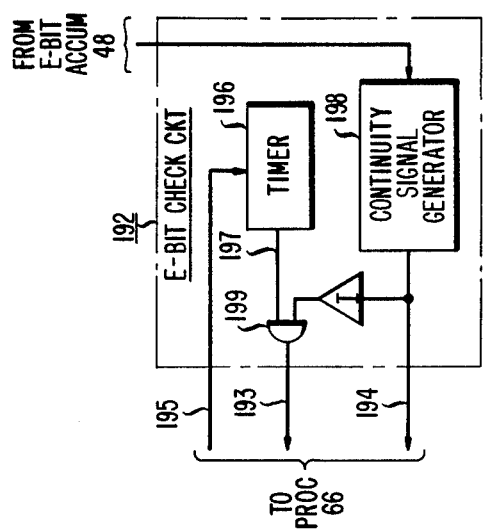
FIG. 9 is a diagram of an E-bit check circuit used in the present embodiment.

FIG. 9 shows the portion of E-bit check circuit 192 associated with one incoming channel, i.e., communication path. A timer 196 begins to count in response to an instruction from processor 66 on conductor 195. When the predetermined period of time has passed since the instruction was received from processor 66 timer 196 transmits a logical "1" on conductor 197 which is connected as one input of AND gate 199, the output of which is connected to conductor 193. Continuity signal generator 198 receives the E-bit position of the associated channel and generates a logical "1" output on conductor 194 in response to a logical "1" E-bit. The logical "1" on conductor 194 is continuously applied until a logical "0" E-bit is found by continuity signal generator 198. The output signals from continuity signal generator 198 are also inverted and applied to an input of AND gate 199. Accordingly, when timer 196 generates its logical "1" output, it will be applied as a discontinuity signal to conductor 193 via AND gate 199 when continuity signal generator 198 is generating a logical "0" output, indicating that no E-bits have been received. Alternatively, whenever continuity signal generator 198 is generating a logical "1" output, the signal on conductor 193 is forced to a logical "0" while the logical "1" continuity signal is transmitted on conductor 194. It should be noted that the functions of the E-bit check circuit may be advantageously performed by processor 66, thus, making the separate E-bit check circuit 192 unnecessary.

Figure 4:
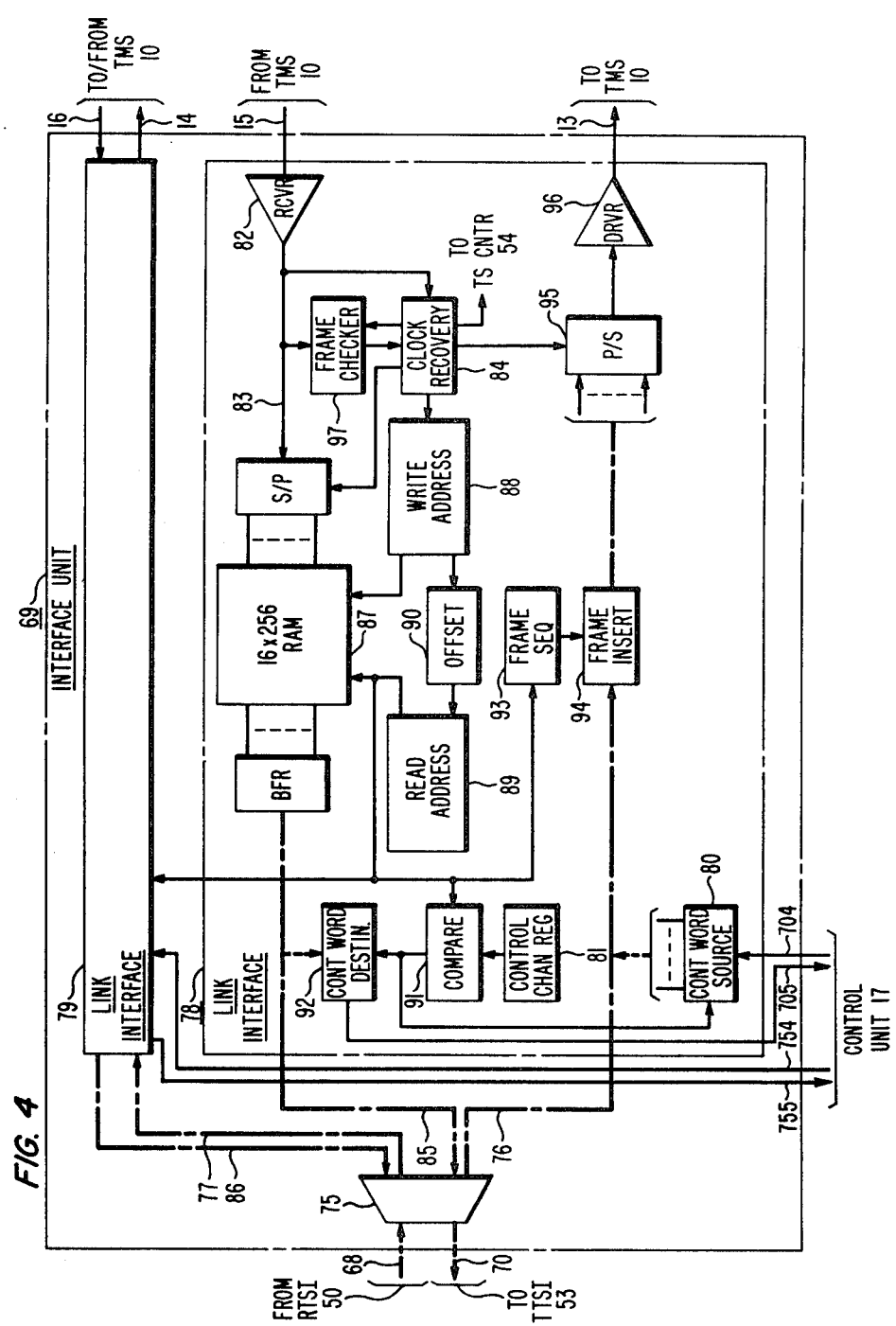
FIG. 4 is a diagram of a link interface unit included in the time-slot interchange unit of FIG. 3 for communication with a time-multiplexed switching unit of the embodiment of FIG. 1.
Figure 10:
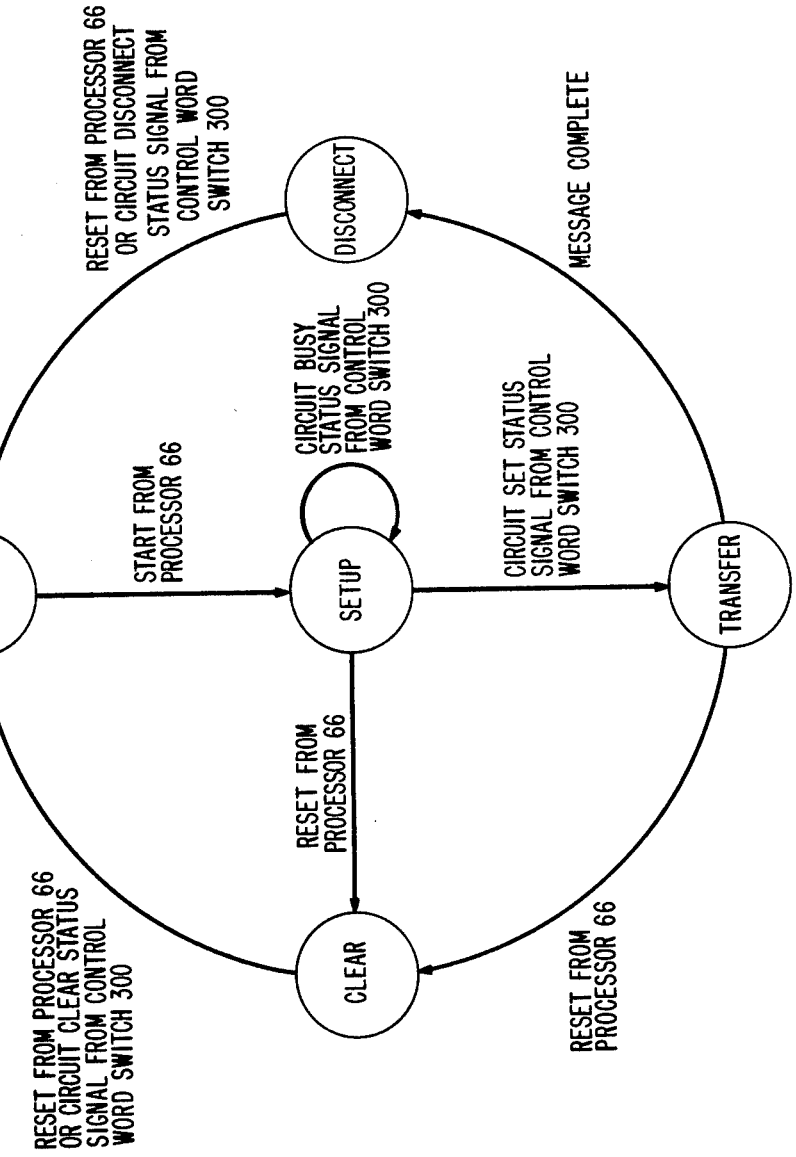
FIG. 10 is a state diagram for a DMA transmit control circuit included in the control unit of FIG. 3.
Figure 13:
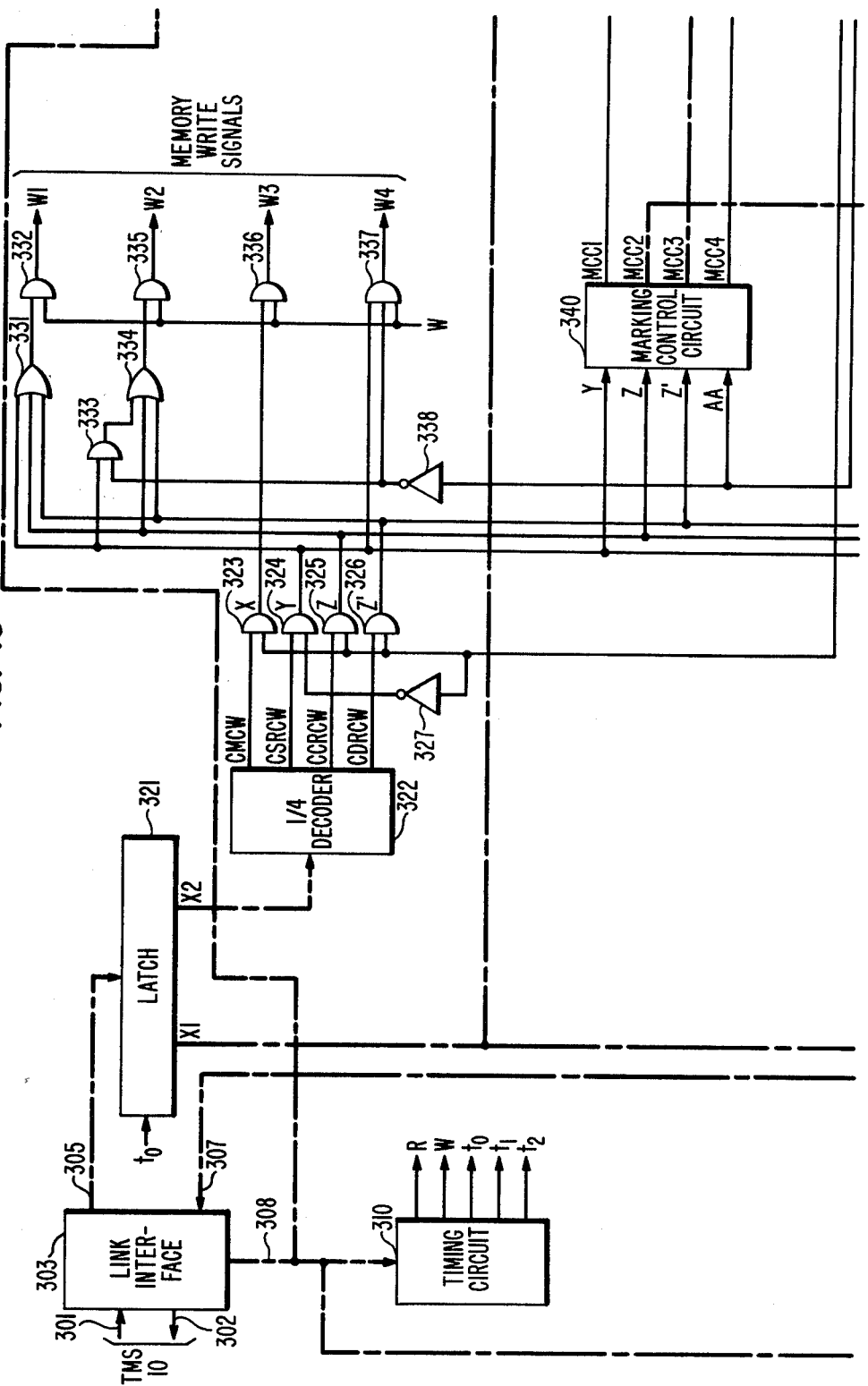
FIGS. 13 through 16, when arranged in accordance with FIG. 17, present a more detailed diagram of the control word switch included in the embodiment of FIG. 1.
Figure 14:
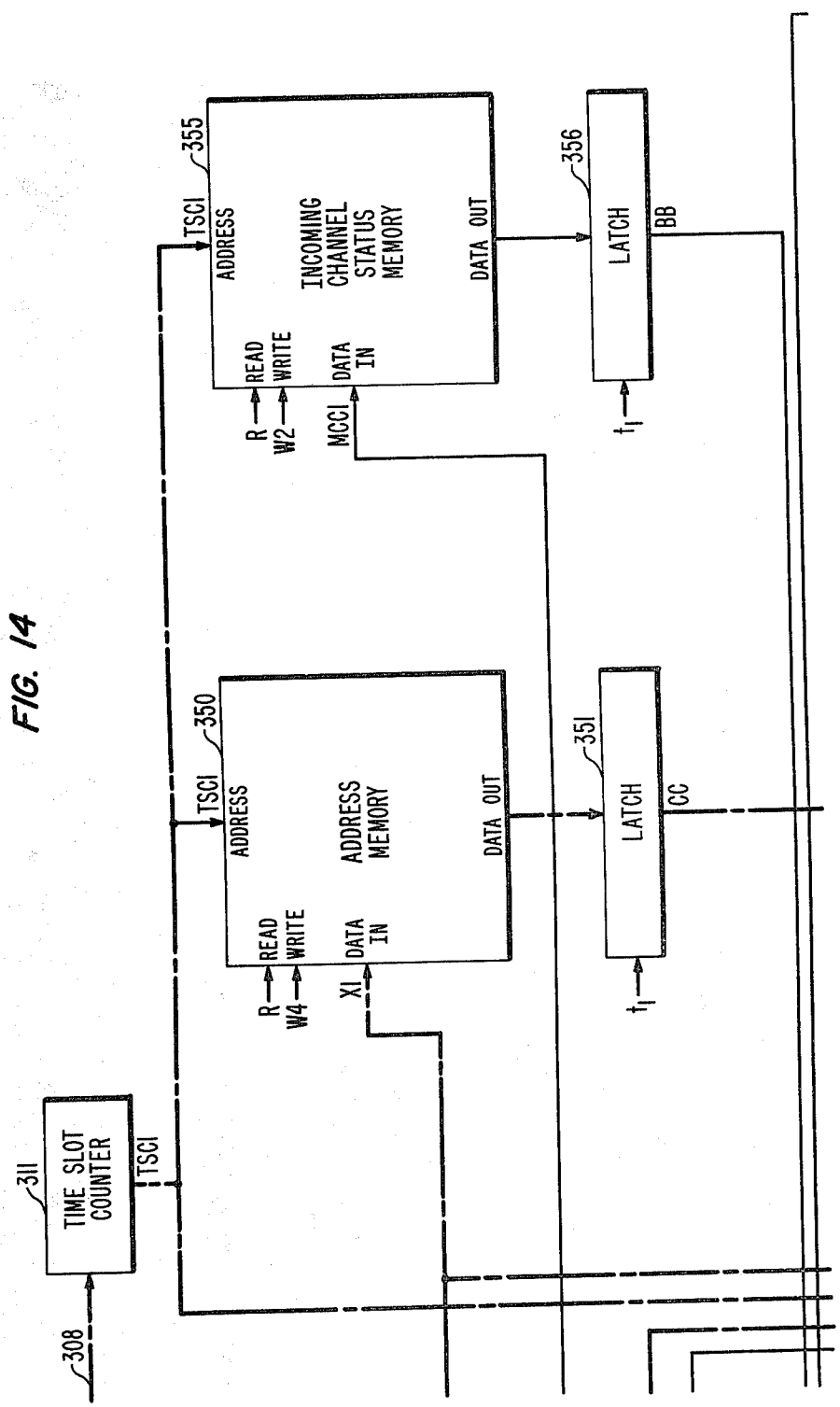
Figure 15:
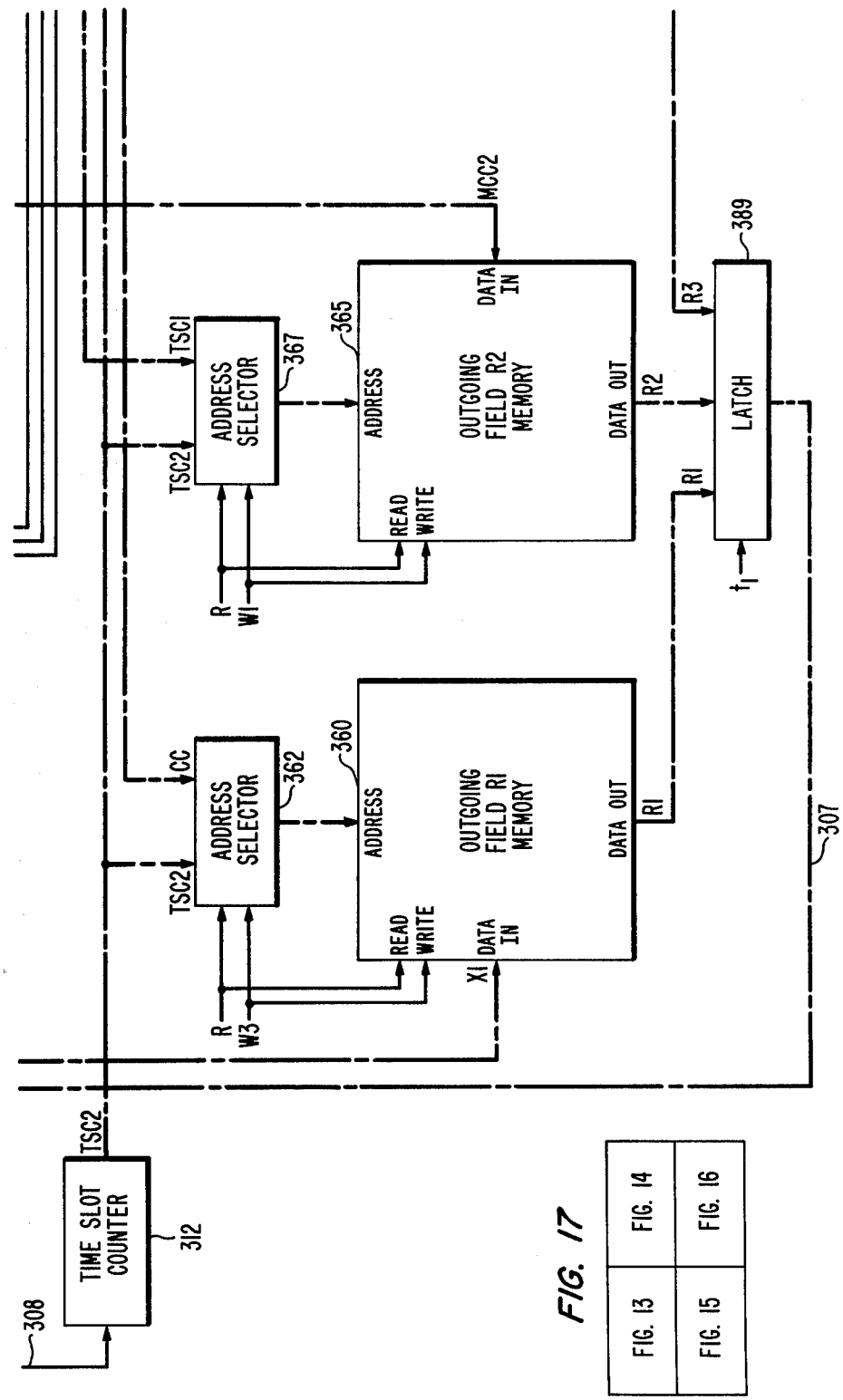
Figure 16:
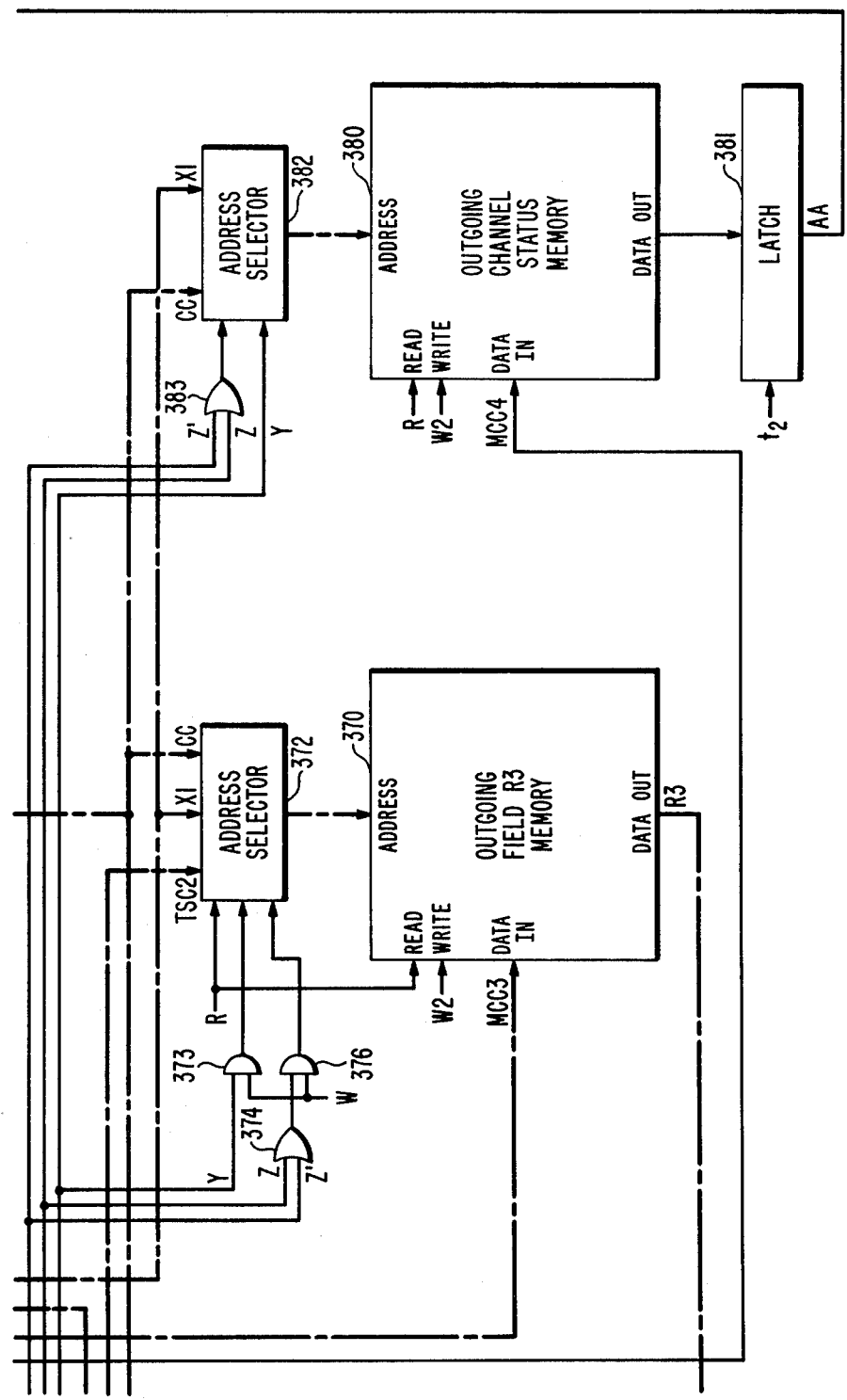

The following is a description of the primary mode of communication between the various control entities of the switching system. As an example consider that processor 66 of the control unit 17, as part of a call setup sequence, determines that a given control message must be conveyed to control unit 18. Processor 66 stores the given control message in memory 57. Processor 66 then transmits a START command via bus 59 to a DMA transmit control circuit 701, which command indicates that a control message is to be transmitted via control channel 61 to time-slot interchange unit 12 and its associated control unit 18. Processor 66 also notifies circuit 701 that the given control message includes a certain number of control message control words. Circuit 701 has five operating states as shown in the state diagram of FIG. 10. Assuming that circuit 701 is in the READY state, i.e. it is not involved in transmitting another control message, it changes to the SETUP state in response to the START command and transmits a given circuit setup request control word by means of a path 704 to a control word source register 80 (FIG. 4) in interface unit 69. The circuit setup request control word is defined as such by having its definition field X2=01 (FIG. 11) and has in its information field X1 the binary equivalent of 61, the destination control channel number. The circuit setup request control word is inserted in time slot TS 1 of time-multiplexed line 13 by interface unit 69, described in detail later herein. By operation of time-multiplexed switch 10, the circuit setup request control word is transmitted to control word switch 300 in time slot TS 1 of time-multiplexed line 301. Control word switch 300, which also is described in detail later herein, receives the circuit setup request control word and determines based on a stored bit whether control channel 61 to time-slot interchange unit 12 is busy or idle. If the destination control channel 61 is busy, control word switch 300 transmits a circuit busy status signal by inserting a status field R2=11 in the next control word transmitted in time slot TS 1 of time-multiplexed line 302. That control word is transmitted in time-slot TS 1 of time-multiplexed line 15 by time-multiplexed switch 10 and is received by interface unit 69 and stored in a control word destination register 92 (FIG. 4). The control word stored in register 92 is transmitted via a path 705 to a DMA receive control circuit 702, which extracts bits B and C comprising status field R2, and transmits those bits via path 706 to circuit 701. Upon receipt of the status field R2=11, i.e., the circuit busy status signal, circuit 701 remains in the SETUP state (FIG. 10) and retransmits the given circuit setup request control word to control word source register 80 in interface unit 69, and the word is inserted in time slot TS 1 of time-multiplexed line 13 as before. This process repeats and control word switch 300 repetitively receives the given circuit setup request control words until the control channel 61 to time-slot interchange unit 12 becomes idle, at which time control word switch 300 stores the binary equivalent of 61 in a memory location associated with channel 1 of time-multiplexed line 301 and transmits circuit set status signals to time-slot interchange units 11 and 12. Control word source 300 transmits the circuit set status signal to time-slot interchange unit 12 by including the status field R3=10 (FIG. 12) in a control word transmitted in control channel 61. The operation of a destination time-slot interchange unit and its associated control unit in response to status signals and control message control words is described later herein. Control word switch 300 transmits the circuit set status signal to time-slot interchange unit 11 by including the status field R2=10 (FIG. 12) in a control word transmitted in control channel 1. The control word is received by circuit 702, and the bits of status field R2 are extracted and transmitted via path 706 to circuit 701.

Upon receipt of the status field R2=10, i.e., the circuit set status signal, circuit 701 changes to the TRANSFER state (FIG. 10) and transmits a signal to a direct memory access (DMA) unit 703, of a type well known in the art, which, in response to the signal, begins reading the control message control words which comprise the given control message stored in memory 57 and transmitting those control message control words on path 704 via circuit 701 at the rate of one per frame. The control message control words are then transmitted from interface unit 69 to control word switch 300 in control channel 1. Each of the control message control words is identified as such by having a definition field X2=00 (FIG. 11). Control word switch 300 then transmits each control message control word received in control channel 1, to time-slot interchange unit 12 in control channel 61 based on the content of the memory location associated with incoming channel 1. Recall that processor 66 notified circuit 701 that the given control message included a certain number of control message control words. When the entire control message has been transmitted, circuit 701 changes to the DISCONNECT state (FIG. 10) and transmits a circuit disconnect request control word, identified as such by having a definition field X2=11 (FIG. 11), on path 704. The circuit disconnect request control word is transmitted from interface unit 69 to control word switch 300 in control channel 1. Control word switch 300 stores bits indicating the active/idle status of each incoming control channel and the busy/idle status of each outgoing control channel. Upon receipt of the circuit disconnect request control word, control word switch 300 marks incoming control channel 1 and outgoing control channel 61 as idle and transmits circuit disconnect status signals to time-slot interchange units 11 and 12 by including a status field R2=01 in the next control word transmitted in control channel 1 and by including a status field R3=01 in the next control word transmitted in control channel 61. Upon receipt of the circuit disconnect status signal, circuit 701 returns to the READY state (FIG. 10) where it is available to transmit another control message.

When circuit 701 is in the SETUP state or the TRANSFER state, processor 66 may terminate the control message transmission by transmitting a RESET command via bus 59 to circuit 701 if, for example, the given control message stored in memory 57 is in error. Circuit 701 responds to this RESET command by changing to the CLEAR state (FIG. 10) and transmitting a circuit clear request control word, identified as such by having a definition field X2=10 (FIG. 11), on path 704. The circuit clear request control word is transmitted from interface unit 69 to control word switch 300 in control channel 1. Upon receipt of the circuit clear request control word, control word switch 300 marks incoming control channel 1 and outgoing control channel 61 as idle and transmits circuit clear status signals to time-slot interchange units 11 and 12 by including a status field R2=00 (FIG. 12) in the next control word transmitted in control channel 1 and by including a status field R3=00 in the next control word transmitted in control channel 61. Upon receipt of the circuit clear status signal in control channel 1, circuit 701 returns to the READY state. Note that if circuit 701 remains in either the CLEAR state or the DISCONNECT state because of a failure to receive the appropriate circuit clear or circuit disconnect status signals, processor 66 can transmit a RESET command via bus 59 to return circuit 701 to the READY state.

The operation of a destination time-slot interchange unit and its associated control unit in response to status signals and control message control words is described by considering that time-slot interchange unit 11 is the destination of a control message from one of the other time-slot interchange units or from central control 230. By the operation of time-multiplexed switch 10, each control word transmitted in channel 1 on time-multiplexed line 302 is in turn transmitted in channel 1 on time-multiplexed line 15 to interface unit 69, where it is stored in control word destination register 92 (FIG. 4) and conveyed via path 705 to DMA receive control circuit 702. Circuit 702 detects circuit set, circuit disconnect and circuit clear status signals based upon the status field R3 of each received control word. The receipt of a circuit set status signal indicates that the control message control words which comprise a control message will be transmitted in channel 1 on time-multiplexed line 15 and in turn conveyed via path 705 to circuit 702. Therefore, circuit 702 notifies DMA unit 703 of the incoming control message and each control word subsequently received on path 705 is conveyed via circuit 702 and DMA unit 703 to memory 57 for storage therein. When circuit 702 detects a circuit disconnect status signal, it notifies processor 66 via bus 59 that a complete control message has been stored in memory 57 and processor 66 can then read and process the stored control message. However, if circuit 702 detects a circuit clear status signal rather than a circuit disconnect status signal, it notifies processor 66 via bus 59 that the control message control words stored in memory 57 should be disregarded.

The previous example described the arrangement comprising DMA transmit control circuit 701, DMA receive control circuit 702, DMA unit 703, and paths 704 and 705 with respect to control channel 1 on time-multiplexed lines 13 and 15. A substantially identical arrangement comprising a DMA transmit control circuit 751, a DMA receive control circuit 752, a DMA unit 753 and paths 754 and 755 is used with respect to control channel 2 on time-multiplexed lines 14 and 16.

Interface unit 69, which is shown in detail in FIG. 4, includes a multiplex/demultiplex circuit 75 and two link interfaces 78 and 79. Multiplex/demultiplex circuit 75 is connected to receive data words from the receive time-slot interchange 50 via time-multiplexed line 68 and to transmit data words to transmit time-slot interchange 53 via time-multiplexed line 70. Recall that both time-multiplexed lines 68 and 70 convey data words at the rate of 512 channels per 125-microsecond frame. Multiplex/demultiplex circuit 75 splits the information received on time-multiplexed line 68 into two time-multiplexed lines 76 and 77 by transmitting the data words in each even-numbered channel on time-multiplexed line 77 and by transmitting each odd-numbered channel on time-multiplexed line 76. Each of the time-multiplexed lines 76 and 77 thus conveys information at the rate of 256 channels per frame. Additionally, multiplex/demultiplex circuit 75 combines the information on two 256-channel time-multiplexed lines 85 and 86 onto the 512-channel time-multiplexed line 70. This combination occurs by alternatingly transmitting the data words from time-multiplexed lines 85 and 86 such that the data words from time-multiplexed line 85 are transmitted in the odd-numbered channels of time-multiplexed line 70 while data words from time-multiplexed line 86 are transmitted in even-numbered channels. In the present embodiment, time-multiplexed lines 76 and 85 are connected to link interface 78, and time-multiplexed lines 77 and 86 are connected to link interface 79. It should be noted that time-slot interchange unit 11 operates on the basis of 512 time slots (channels) per frame while the link interfaces 78 and 79 and the time-multiplexed switch 10 operate on the basis of 256 time slots (channels) per frame. Further, the channels of data words received from and transmitted to time-slot interchange unit 11 are in complete synchronism. That is, whenever a channel having a given numerical designation is received by link interface 78 from time-slot interchange unit 11, both link interfaces 78 and 79 will be receiving and transmitting channels having the same numerical designation with respect to the time-slot interchange unit 11. In order to maintain synchronism after the split, all odd-numbered channels on time-multiplexed line 68 are delayed by multiplex/demultiplex circuit 75 so that the odd-numbered channel and the immediately following even-numbered channel are transmitted on a respective one of time-multiplexed lines 76 and 77 substantially simultaneously. Similarly, each data word from link interface 79 on time-multiplexed line 86 is delayed by multiplex/demultiplex circuit 75 such that it is transmitted on time-multiplexed line 70 immediately after the data word received by multiplex/demultiplexer circuit 75 substantially simultaneously therewith. In the course of the following description, the time slot of a given data word refers to its time slot with respect to link interfaces 78 and 79 and time-multiplexed switch 10. For example, data words from channels 1 and 2 of time-multiplexed line 68 are both associated with time slot TS 1 of link interfaces 78 and 79 and time-multiplexed switch 10. Each of the link interface units 78 and 79 is uniquely associated with one input/output port pair of time-multiplexed switch 10.

Link Interface 78

Link interface 78 (FIG. 4) includes a receiver 82 which receives data words transmitted serially from time-multiplexed switch 10 via time-multiplexed line 15 and serially retransmits this information on a conductor 83. A clock recovery circuit 84 receives the incoming bit stream by connection to conductor 83 and recovers a 32.768-megahertz clock signal therefrom. This clock signal is used to provide timing for link interface circuit 78. For reasons to be described in greater detail later herein, the information received on time-multiplexed line 15 is not necessarily in channel synchronization with that transmitted on time-multiplexed line 13. In order to achieve channel synchronism between the data words on time-multiplexed lines 76 and 85, the incoming data words on conductor 83 are buffered in a random access memory circuit 87. The data words on conductor 83 are written into random access memory 87, at a location defined by a write address generator 88. Write address generator 88 receives a 2.048-megahertz clock signal from clock recovery circuit 84 and in response thereto generates a recurring sequence of 256 write addresses in synchronism with the incoming data words on conductor 83. Data words are read from random access memory 87 for transmission to time-slot interchange unit 11 at locations defined by a read address generator 89 which generates a recurring sequence of 256 read addresses. The read addresses are derived from information received from an offset circuit 90. Offset circuit 90 receives the write addresses generated by write address generator 88, and effectively subtracts a predetermined number therefrom. The result of this subtraction is then transmitted to read address generator 89. In this manner, read address generator 89 generates a sequence of read addresses which is a predetermined number of addresses behind those generated by write address generator 88. In the present embodiment, read address generator 89 is approximately one-fourth of a frame (64 time slots) behind the addresses generated by write address generator 88.

Link interfaces 78 and 79 of interface unit 69 operate in a master-slave mode to maintain channel synchronism. In the present embodiment, link interface 78 is the master and continues to operate in the manner described above. The read address generator of link interface 79 is, however, driven by read addresses from read address generator 89 of link interface 78. It should be noted that, due to possible differences in the length of time-multiplexed lines 15 and 16, more or less than one-quarter frame of information may separate the write addresses and read addresses utilized in link interface 79. This occurs since the data words transmitted on time-multiplexed lines 85 and 86 are in channel synchronism while no such synchronism is required on time-multiplexed lines 15 and 16.

The same channel is used in a given link interface to both transmit and receive control words. The particular channel used by a given link interface, e.g., link interface 78, to convey control words is preset and stored in a control channel register 81. Each read address generated by read address generator 89 is transmitted to a comparator 91 which compares that read address to the preset control channel designation stored in control channel register 81. When comparator 91 determines that the instant read address is identical to the control channel designation, it generates a gating signal which is transmitted to control word source register 80 and to control word destination register 92. Control word destination register 92, in response to the gating signal from comparator 91, stores the information on time-multiplexed line 85. During that particular channel, the information on time-multiplexed line 85 comprises the contents of the control channel to be utilized by the control unit 17. The contents of control word destination register 92 are transmitted to DMA receive control circuit 702 before the next control channel. Similarly, control word source register 80 responds to the gating signal from comparator 91 by gating its contents out to time-multiplexed line 76, thus transmitting the control word. Control words are transmitted and received by link interface 79 in a substantially similar manner, however, the particular control channel designation associated with link interface 79, channel 2, is different than that associated with link interface 78, channel 1.

The read addresses generated by read address generator 89 are also transmitted to a frame sequence generator 93. Frame sequence generator 93 responds thereto by generating a unique sequence of framing bits at the rate of one bit per channel. During each channel, the bit generated by the frame sequence generator 93 is transmitted to a frame insert circuit 94 which places the framing bit into the D-bit location of the data word from time-slot interchange unit 11. The data word including this framing bit is then transmitted via a parallel-serial register 95 and a driver circuit 96 to time-multiplexed line 13 which is connected to a unique input port of time-multiplexed switch 10. Each data word received by link interface 78 on time-multiplexed line 15 includes a framing bit which is generated and transmitted by the time-multiplexed switch 10. A frame checker 97 reads each framing bit of each data word from time-multiplexed switch 10 and determines if the communication between time-multiplexed switch 10 and itself is still in synchronism. If synchronism exists, no corrections are made; however, if synchronism is found not to exist, reframing is accomplished by communication with clock recovery circuit 84 in a manner well known in the art.

Central Control 230

Central control 230, an illustrative embodiment of which is shown in FIG. 7, transmits and receives control words via time-multiplexed switch 10 and control word switch 300 in a manner similar to that of each of the control units, e.g., 17. However, whereas control unit 17 has access to two control channels, channel 1 at input/output port pair P1 and channel 2 at input/output port pair P2, central control 230 has access in this embodiment to nine control channels, 63 through 71 at input/output port pair P63. Central control 230 is connected to input/output port P63 by two 256-channel time-multiplexed lines 201 and 202, although channels 63 through 71 are the only channels on those lines that are actively used. Central control 230 includes a link interface 231 which is functionally similar to link interface 78 (FIG. 4) but which includes nine arrangements similar to that of control channel register 81, compare circuit 91, control word destination register 92 and control word source register 80 to insert control words in time slots TS 63 through TS 71 on time-multiplexed line 201 and to extract control words from time slots TS 63 through TS 71 on time-multiplexed line 202. Central control 230 also includes a processor 240 and a memory 241 interconnected by a bus 249 as well as nine arrangements for controlling the transmission and receipt of control messages, only the arrangement comprising a DMA transmit control circuit 251, a DMA receive control circuit 252, a DMA unit 253 and paths 254 and 255 and the arrangement comprising a DMA transmit control circuit 261, a DMA receive control circuit 262, a DMA unit 263 and paths 264 and 265 being specifically shown in FIG. 7. Each of the nine arrangements is substantially identical to the arrangement of DMA transmit control circuit 701, DMA receive control circuit 702, DMA unit 703 and paths 704 and 705 of control unit 17 (FIG. 3) and is not further described herein. Processor 240 controls the operation of time-multiplexed switch 10 by communicating to a control memory 29 (FIG. 1) via bus 249.

Time-Multiplexed Switch 10

Figure 5:
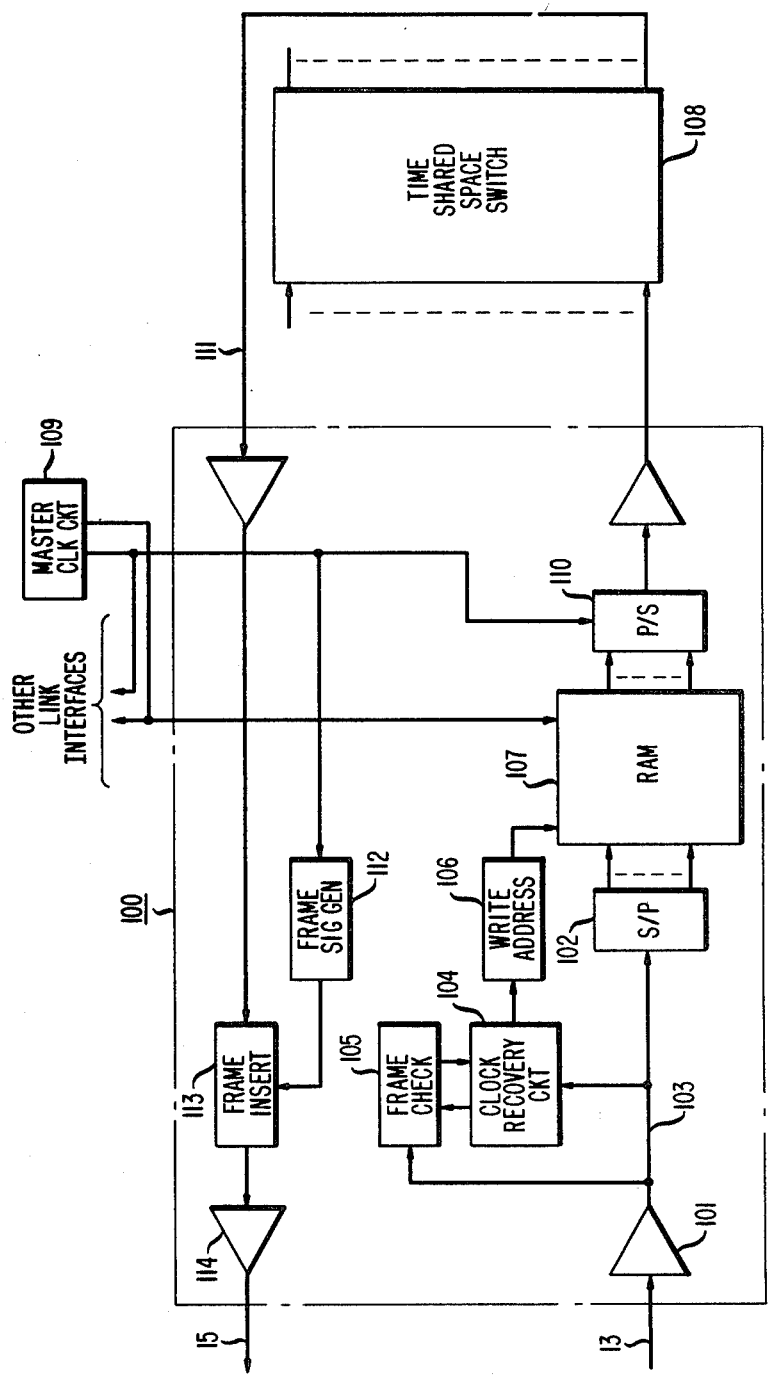
FIG. 5 is a diagram of a link interface unit included in the time-multiplexed switching unit of the embodiment of FIG. 1 for communication with the time-slot interchange unit of FIG. 3.

The input and output ports of time-multiplexed switch 10 can be considered in pairs for both ports are connected to the same link interface. Further, each pair of input and output ports of the time-multiplexed switch 10 is connected to a time-multiplexed switch link interface of a type similar to link interfaces 78 and 79. In the present embodiment, link interface 78 is connected to a time-multiplexed switch link interface 100 (FIG. 5). Time-multiplexed switch link interface 100 includes a receiver 101 which receives data words from time-multiplexed line 13 and transmits these data words to a serial-parallel register 102 via a time-multiplexed line 103. The bit stream from time-multiplexed line 103 is also applied to a clock recovery circuit 104 and a frame check circuit 105 which derive clock signals therefrom and determine if frame synchronism is present, respectively. Time-multiplexed switch link interface 100 further includes a write address generator 106 which generates a sequence of write addresses in response to signals from clock recovery circuit 104. Each data word transmitted to serial-parallel register 102 is then written into a random access memory 107 at the address generated by write address generator 106.

Time-multiplexed switch 10 also includes the time-shared space division switch 108 which operates in frames of 256 time slots of approximately 488 nanoseconds each to complete paths among its input and output ports. Control information defining the switching path between the input and output ports to be connected during each time slot is stored in control memory 29 (FIG. 1) which is read each time slot to establish those connections. Recall that each time slot has a numerical designation and that during a given time slot the data word channel having the same numerical designation is to be switched. Accordingly, all data words in a channel having a given numerical designation must be transmitted to time-shared space division switch 108 during their associated time slot to avoid inaccurate switching. To this end, time-multiplexed switch 10 includes a master clock circuit 109 for generating a recurring sequence of 256 read addresses which are transmitted to each random access memory of each time-multiplexed switch link interface substantially simultaneously. Accordingly, random access memory 107 and the equivalent random access memories included in all other time-multiplexed switch link interfaces read a data word associated with the same time slot at substantially the same time. In the present embodiment, the data words read from random access memory 107 are transmitted to a parallel-serial shift register 110 from which they are transmitted to time-shared space division switch 108.

All data words to be transmitted on time-multiplexed line 15 to link interface 78 are received from the time-shared space division switch 108 on a conductor 11 within one time slot of their transmission into time-shared space division switch 108. Time-multiplexed switch link interface 100 includes a frame sequence generator 112 which generates a sequence of framing bits at the rate of one bit per time slot. The framing bits are transmitted to a frame insert circuit 113 which places the frame bit in bit position D of each data word on conductor 111. Each data word on conductor 111 is then transmitted via driver circuit 114 to link interface 78 via time-multiplexed line 15.

Control Word Switch 300

Each control word is transmitted by time-multiplexed switch 10 to control word switch 300 (FIG. 1) via 256-channel time-multiplexed line 301. Similarly control words are transmitted from control word switch 300 to time-multiplexed switch 10 via 256-channel time-multiplexed line 302. Lines 301 and 302 are connected to input/output port pair P64. Control word switch 300 (FIGS. 13 through 16 arranged in accordance with FIG. 17) includes a link interface 303 which is substantially identical to link interface 78 (FIG. 4) but does not contain the control word source register 80, the control channel register 81, the compare circuit 91 or the control word destination register 92 since the functions performed by these circuits are not required in control word switch 300. Each control word received on time-multiplexed line 301 is transmitted in parallel from link interface 303 via a path 305 to be stored in a latch 321. Similarly control word stored in a latch 389 are conveyed in parallel via a path 307 to link interface 303, and in turn are serially transmitted by link interface 303 on time-multiplexed line 302. Link interface 303 includes a clock recovery circuit (not shown) which derives 32.768-megahertz and 8-kilohertz clock signals from the bit stream on line 301. These clock signals are transmitted via a path 308 to a timing circuit 310 and to two time-slot counters 311 and 312. Timing circuit 310 transmits timing signals on conductors R, W, $t_0$, $t_1$ and $t_2$ (FIG. 18), which signals are used throughout control word switch 300 as described later herein. Time-slot counter 311 transmits on path TSC1 a recurring sequence of 256 time-slot designations associated with the incoming control channels on path 305. Similarly time-slot counter 312 transmits on path TSC2 a recurring sequence of 256 time-slot designations which define outgoing control channels on path 307. The relationship between the time-slot designations transmitted by time-slot counters 311 and 312 is fixed since both counters 311 and 312 are driven by the clock signals on path 308. The portion of control word switch 300 excluding link interface 303 is referred to herein as a control word routing circuit.

Control word switch 300 performs its required functions by appropriately writing into and reading from six memories 350, 355, 360, 365, 370 and 380. Address memory 350 and incoming channel status memory 355 each comprise 256 locations, each location being associated with one of the 256 channels on incoming path 305. Each location of address memory 350 includes eight bits for storing an address which defines one of the 256 channels on outgoing path 307. The defined channel is the destination for control message control words received in the incoming control channel associated with that memory 350 location. Incoming channel status memory 355 stores a single bit in each of its 256 locations defining the active/idle status of the associated incoming channel (0=idle, 1=active). Outgoing field R1 memory 360, outgoing field R2 memory 365, outgoing field R3 memory 370 and outgoing channel status memory 380 each include 256 locations, each location being associated with one of the 256 channels on outgoing path 307. Memory 360 comprises 8-bit locations used to store the information field R1 (FIG. 12) of each of the control channels to be transmitted on outgoing path 307. Similarly memories 365 and 370 each comprise 2-bit locations storing fields R2 and R3, respectively, for each outgoing control channel. Each control word transmitted on path 307 includes the fields R1, R2 and R3 read from the locations of memories 360, 365 and 370 associated with the outgoing control channel defined by time-slot counter 312. Outgoing channel status memory 380 stores a single bit in each of its 256 locations defining the busy/idle status of each outgoing control channel on path 307 (0=idle, 1=busy). The contents of each of the memories 350, 355, 360, 365, 370 and 380 are read at the memory DATA OUT ports from locations defined by signals received at the memory ADDRESS ports when timing circuit 310 transmits a logic one signal via conductor R (FIG. 8) to the memory READ control terminals during the first half of each approximately 488-nanosecond time slot. Information received at the memory DATA IN ports can be stored in the memory locations defined by signals received at the memory ADDRESS ports during the second half of each time slot, but such information is stored in a given memory only if a logic one memory write signal is transmitted via the appropriate one of four conductors W1, W2, W3 and W4 to the WRITE control terminal of the given memory.

Recall that each control word received on time-multiplexed line 301 includes an information field X1 and a definition field X2 and that field X2 defines the control word as a control message control word, a circuit setup request control word, a circuit clear request control word or a circuit disconnect request control word. Also recall that the information field X1 of a circuit setup request control word contains the address defining the requested outgoing control channel. When a control word in a given incoming control channel on path 305 is determined to be a circuit setup request control word, the active/idle status bit stored in the memory 355 location associated with the given incoming control channel and the busy/idle status bit stored in the memory 380 location associated with the requested outgoing control channel are read. If both status bits indicate an idle status, the given incoming control channel and the requested outgoing control channel can be coupled for communication. Information field X1 comprising the address of the requested outgoing control channel is stored in the memory 350 location associated with the given incoming control channel. The status bits in memory 355 and 380 are changed to indicate that the given incoming control channel is active and that the requested outgoing control channel is busy. In addition characters are stored in the memory 365 location associated with the given incoming control channel and the memory 370 location associated with the requested outgoing control channel. The character stored in memory 365 will be inserted in field R2 of the outgoing control channel having the same number as the given incoming control channel, as the circuit set status signal to the originating communication unit (one of the time-slot interchange units or central control 230). The character stored in memory 370 will be inserted in field R3 of the requested outgoing control channel as the circuit set status signal to the destination communication unit.

However, if the memory 355 and the memory 380 status bits read in response to the circuit setup request control word indicate that although the given incoming control channel is idle, the requested outgoing control channel is busy, nothing is written into memories 350, 355, 370 and 380 but a character is stored in memory 365 to be inserted in the outgoing control channel to the originating communication unit as the circuit busy status signal.

Once the given incoming control channel and the requested outgoing control channel have been coupled for communication, information field X1 of each control message control word received in the given incoming control channel on path 305 is stored in the memory 360 location associated with the requested outgoing control channel as defined by the address stored in memory 350 in response to the circuit setup request control word. Each such stored field is subsequently inserted in information field R1 of the requested outgoing control channel on path 307.

When a circuit disconnect request control word is received in the given incoming control channel on path 305, the status bits in memories 355 and 380 are changed to indicate that the given incoming control channel and the requested outgoing control channel are again idle and characters are stored in memories 365 and 370 to be inserted as the circuit disconnect status signals in outgoing control channels to the originating and destination communication units, respectively. The response to a circuit clear request control word is identical to that for a circuit disconnect request control word except that different characters are stored in memories 365 and 370 to be used as the circuit clear status signals.

As a reliability measure, control message control words, circuit disconnect request control words and circuit clear request control words received in the given incoming control channel on path 305 are ignored unless the status bit for that channel stored in memory 355 indicates an active status.

Figures 18, 19:
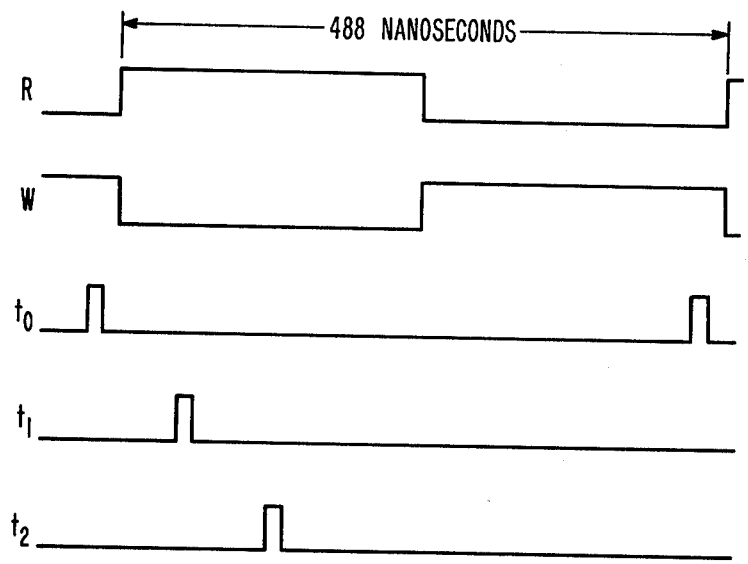
FIG. 18 is a timing diagram relevant to the control word switch included in the embodiment of FIG. 1.
FIG. 19 is a logic table relevant to a marking control circuit included in the control word switch of the embodiment of FIG. 1.

The operation of control word switch 300 is described in more detail with reference to an example wherein incoming control channel 7 and outgoing control channel 23 are coupled for control message communication. Each control word received on incoming path 305 is stored in a latch 321 when timing circuit 310 generates a logic one signal on conductor $t_0$ at a time during the second half of each time slot (FIG. 18). The definition field X2 of each control word stored in latch 321 is transmitted via a path X2 to a 1-out-of-4 decoder 322. When a given control word, received in incoming control channel 7 on path 305 and stored in latch 321, is a circuit setup request control word, defined as such by having its definition field X2=01 (FIG. 11), decoder 322 transmits a logic one signal on a conductor CSRCW to one input terminal of an AND gate 324. The time-slot designations transmitted by time-slot counter 311 on path TCS1 are received at the ADDRESS port of incoming channel status memory 355. The bit stored in the location of memory 355 defined by the time-slot designation of time-slot counter 311 is read at the memory 355 DATA OUT port and stored in latch 356 when timing circuit 310 transmits a logic one signal to latch 356 on conductor $t_1$ at a time during the first half of the time slot (FIG. 18). The bit stored in latch 356 is transmitted via conductor BB to an inverter 327 having its output terminal connected to the other input terminal of AND gate 324. If the bit stored in latch 356 indicates that incoming control channel 7 is idle, i.e., the stored bit is a logic zero, AND gate 324 transmits a logic one signal on a conductor Y. A logic one signal on conductor Y indicates that the control word stored in latch 321 is a circuit setup request control word and that the incoming channel in which that control word was received is presently an idle channel.

In accordance with the present example, the information field X1 (FIG. 11) of the circuit setup request control word stored in latch 321 contains the address or designation of outgoing control channel 23, in which control message control words subsequently received in incoming control channel 7 are to be transmitted. In other words, the circuit setup request control word indicates a request that incoming control channel 7 be coupled for communication with outgoing control channel 23. Field X1 is conveyed via path X1 to an address selector 382. Address selector 382 operates as follows. When a logic one signal is transmitted by an OR gate 383 to address selector 382, the address present on a path CC is transmitted to the memory 380 ADDRESS port. However, when a logic one signal is transmitted to address selector 382 on conductor Y, the address present on path X1 is transmitted to the memory 380 ADDRESS port. Accordingly, since the control word stored in latch 321 is a circuit setup request control word and since incoming control channel 7 is presently idle, a logic one signal is present on conductor Y and the information field X1 stored in latch 321, which contains the binary equivalent of 23, is conveyed via path X1 and address selector 382 to the memory 380 ADDRESS port. The bit stored in memory 380 location 23 is read at the memory 380 DATA OUT port and stored in latch 381 when timing circuit 310 transmits a logic one signal to latch 381 on conductor $t_2$ at a time during the first half of the time slot but after the transmission of the logic one signal on conductor $t_1$ (FIG. 18). The bit stored in latch 381 is transmitted via conductor AA to a marking control circuit 340 and to an inverter 338, having its output terminal connected to one input terminal of an AND gate 333 and to one input terminal of a three-input AND gate 337. The logic one signal on conductor Y is received at the other input terminal of AND gate 333. If the bit stored in latch 381 indicates that outgoing control channel 23 is idle, i.e., the stored bit is a logic zero, AND gates 333 transmits a logic one signal to one input terminal of a three-input OR gate 334, which in turn transmits a logic one signal to one input terminal of an AND gate 335. The logic one signal on conductor Y is transmitted to one input terminal of a three-input OR gate 331, which in turn transmits a logic one signal to one input terminal of an AND gate 332. The logic one signal on conductor Y is also transmitted to a second input terminal of AND gate 337. When timing circuit 310 transmits a logic one signal on conductor W to the other input terminal of AND gate 332, to the other input terminal of AND gate 335 and to a third input terminal of AND gate 337 during the second half of the approximately 488-nanosecond time slot (FIG. 18), AND gate 332 transmits a logic one memory write signal on conductor W1 to the memory 365 WRITE control terminal, AND gate 335 transmits a logic one memory write signal on conductor W2 to the WRITE control terminals of memories 355, 370 and 380 and AND gate 337 transmits a logic one memory write signal on conductor W4 to the memory 350 WRITE control terminal. Accordingly, in the present example when the control word stored in latch 321 is a circuit setup request control word and both incoming control channel 7 and outgoing control channel 23 are idle, certain information is to be written into memories 350, 355, 365, 370 and 380 during the second half of the time slot. The memory 350 location and the memory 355 location to be written into are both location 7, as determined by the time-slot designation transmitted by time-slot counter 311, which designation is also transmitted via path TSC1 to an address selector 367. Since a logic one signal is transmitted on conductor W1 to address selector 367, the designation on path TSC1 is conveyed to the memory 365 ADDRESS port. Accordingly the memory 365 location to be written into is also location 7. The information field X1 stored in latch 321 is conveyed via path X1 to address selectors 372 and 382. Since the logic one signals on conductors Y and W are transmitted to the input terminals of an AND gate 373, AND gate 373 transmits a logic one signal to address selector 372 and accordingly information field X1 is conveyed to the memory 370 ADDRESS port. Further, since the logic one signal on conductor Y is transmitted to address selector 382, information field X1 is also conveyed to the memory 380 ADDRESS port. Accordingly, the location in each of the memories 370 and 380 to be written into is location 23. The information written into memories 350, 355, 365, 370 and 380 when timing circuit 310 transmits the logic one signal on conductor W is defined by the information field X1 stored in latch 321, which field is conveyed via path X1 to the memory 350 DATA IN port, and by the output signals transmitted by marking control circuit 340 on conductor MCC1, paths MCC2 and MCC3 and conductor MCC4 to the DATA IN ports of memories 355, 365, 370 and 380, respectively. The binary equivalent of 23, the destination control channel number, is stored in location 7 of memory 350 to be used for routing control message control words subsequently received in control channel 7 on path 305. The operation of marking control circuit 340 is defined in FIG. 19. Recall that a logic one signal is present on conductor Y and a logic zero signal is present on conductor AA. Therefore, marking control circuit 340 transmits logic one signals on conductors MCC1 and MCC4 to the DATA IN ports of memories 355 and 380 for storage therein. The logic one signal stored in location 7 of memory 355 defines incoming control channel 7 as active. The logic one signal stored in location 23 of memory 380 defines outgoing control channel 23 as busy. Marking control circuit 340 also transmits the character '10' via paths MCC2 and MCC3 to the DATA IN ports of memories 365 and 370 for storage therein. The character '10' stored in location 7 of memory 365 represents the circuit set status signal to be transmitted in outgoing control channel 7 to the originating time-slot interchange unit and its associated control unit. The character '10' stored in location 23 of memory 370 represents the circuit set status signal to be transmitted in outgoing control channel 23 to the destination time-slot interchange unit and its associated control unit. Recall that memories 360, 365 and 370 are all read during the first half of each time slot when timing circuit 310 transmits the logic one signal on conductor R. The logic one signal on conductor R is also transmitted to address selectors 362, 367 and 372 and accordingly the time-slot designation that is generated by time-slot counter 312 and conveyed via path TSC2 to those address selectors, is transmitted to the ADDRESS ports of memories 360, 365 and 370. Accordingly, for each outgoing control channel, the contents of the locations in memories 360, 365 and 370 associated with that channel are read from the DATA OUT ports and, when timing circuit 310 transmits the logic one signal on conductor $t_1$, the read contents are stored as fields R1, R2 and R3 of a 16-bit control word stored in latch 389. The word stored in latch 389 is conveyed via path 307 to link interface 303. Accordingly, after the '10' characters are stored in memory 365 location 7 and memory 370 location 23, the circuit set status signal to the originating time-slot interchange unit is transmitted during the next occurrence of outgoing control channel 7 on path 307 and the circuit set status signal to the destination time-slot interchange unit is transmitted during the next occurrence of outgoing control channel 23 on path 307. The circuit set status signals indicate that incoming control channel 7 and outgoing control channel 23 are coupled for communication. Recall that the originating time-slot interchange unit responds to a circuit set status signal by beginning to transmit the control message control words of a control message at the rate of one word per frame.

If when the exemplary circuit setup request control word was stored in latch 321, incoming control channel 7 was idle as before but outgoing control channel 23 was busy rather than idle, latch 381 would transmit a logic one signal on conductor AA to inverter 338, and inverter 338 would transmit a logic zero signal to the input terminals of AND gates 333 and 337. In that case, AND gates 335 and 337 transmit logic zero signals on conductors W2 and W4, respectively, rather than logic one memory write signals as before and only AND gate 332 transmits a logic one memory write signal on conductor W1. Accordingly only memory 365 location 7 is written into. Since logic one signals are present on both conductors Y and AA, marking control circuit 340 transmits the character '11' (FIG. 19) to the memory 365 DATA IN port for storage in location 7. The character '11' is therefore inserted in field R2 of the next control word transmitted in outgoing control channel 7 on line 307 as the circuit busy status signal to the originating time-slot interchange unit. Recall that the originating time-slot interchange unit responds to circuit busy status signals by repetitively retransmitting the circuit setup request control word until receiving a circuit set status signal indicating that the requested outgoing control channel has become available and that subsequently transmitted control message control words will be routed in that outgoing control channel.

Assume now that incoming control channel 7 and outgoing control channel 23 have been coupled for communication and that the originating time-slot interchange unit transmits a control message control word, defined as such by having its definition field X2=00, in incoming control channel 7. That control message control word is stored in latch 321 and, as a result of the transmission of field X2 to decoder 322, decoder 322 transmits a logic one signal on a conductor CMCW to an input terminal of an AND gate 323. The logic one bit stored in memory 355 location 7 indicating the active status of incoming control channel 7 is read from the memory 355 DATA OUT port and stored in latch 356 when timing circuit 310 transmits the logic one signal on conductor $t_1$ (FIG. 18) to latch 356. Further the contents of memory 350 location 7, as defined by the time-slot designation transmitted from time-slot counter 311 to the memory 350 ADDRESS port, which contents comprise the binary equivalent of 23 stored following the receipt of the previous circuit setup request control word, are stored in latch 351 when timing circuit 310 transmits the logic one signal on conductor $t_1$ to latch 351. The logic one signal stored in latch 356 is conveyed via conductor BB to the other input terminal of AND gate 323, and accordingly AND gate 323 transmits a logic one signal via a conductor X to an input terminal of an AND gate 336. The logic one signal on conductor X indicates that the control word stored in latch 321 is a control message control word and that incoming control channel 7 is active. When timing circuit 310 transmits a logic one signal to the other input terminal of AND gate 336 via conductor W during the second half of the time slot (FIG. 18), AND gate 336 transmits a logic one memory write signal on conductor W3 to the memory 360 WRITE control terminal and to address selector 362. The stored contents of latch 351 are conveyed via a path CC to address selector 362 and, in response to the logic one signal on conductor W3, are in turn transmitted to the memory 360 ADDRESS port. Accordingly, when timing circuit 310 transmits the logic one signal on conductor W, the information field X1 of the control message control word stored in latch 321, which field is conveyed via path X1 to the memory 360 DATA IN port, is stored in memory 360 location 23. The bits stored in memory 360 location 23 are inserted via latch 389 in information field R1 during the next occurrence of outgoing control channel 23 on path 307. Accordingly the information field X1 of a control message control word received in incoming control channel 7 on line 305 is inserted in information field R1 of the next control word transmitted in outgoing control channel 23 on path 307.

Assume now that the originating time-slot interchange unit has transmitted all the control message control words of a control message and then transmits a circuit disconnect request control word, defined as such by having its definition field X2=11, in incoming control channel 7. That circuit disconnect request control word is stored in latch 321 and, as a result of the transmission of field X2 to decoder 322, decoder 322 transmits a logic one signal on a conductor CDRCW to an input terminal of an AND gate 326. In the same manner as described above for the reception of a control message control word, the binary equivalent of 23 is stored in latch 351 and a logic one signal, indicating the active status of incoming control channel 7, is stored in latch 356. The logic one signal stored in latch 356 is conveyed via conductor BB to the other input terminal of AND gate 326. As a result, AND gate 326 transmits a logic one signal on a conductor Z' to an input terminal of OR gate 331 and to an input terminal of OR gate 334. Accordingly, OR gate 331 transmits a logic one signal to an input terminal of AND gate 332 and OR gate 334 transmits a logic one signal to an input terminal of AND gate 335. When timing circuit 310 transmits the logic one signal on conductor W, during the second half of the time slot (FIG. 18), to the other input terminal of AND gate 332 and to the other input terminal of AND gate 335, AND gate 332 transmits a logic one memory write signal on conductor W1 to the memory 365 WRITE control terminal and to address selector 367 and AND gate 335 transmits a logic one memory write signal on conductor W2 to the WRITE control terminals of memories 355, 370 and 380. The memory 355 location to be written into and, because of the logic one signal transmitted to address selector 367 on conductor W1, the memory 365 location to be written into are both location 7, as determined by the time-slot designation transmitted by time-slot counter 311 on path TSC1. The logic one signal on conductor Z' is received at an input terminal of an OR gate 374 and in response thereto OR gate 374 transmits a logic one signal to an input terminal of an AND gate 376. When timing circuit 310 transmits the logic one signal on conductor W to the other input terminal of AND gate 376, AND gate 376 transmits a logic one signal to address selector 372, and accordingly the bits comprising the binary equivalent of 23 stored in latch 351 are conveyed via path CC and address selector 372 to the memory 370 ADDRESS port. The logic one signal on conductor Z' is also received at an input terminal of an OR gate 383, which, in response thereto, transmits a logic one signal to address selector 382. Therefore, the bits comprising the binary equivalent of 23 stored in latch 351 are also conveyed via path CC and address selector 382 to the memory 380 ADDRESS port. Accordingly the locations of memories 370 and 380 to be written into are both location 23. The logic one signal on conductor Z' is also transmitted to marking control circuit 340. In response thereto, marking control circuit 340 transmits logic zero signals on conductors MCC1 and MCC4 (FIG. 19) to the DATA IN ports of memories 355 and 380 for storage therein. The logic zero signal stored in location 7 of memory 355 defines incoming control channel 7 as idle. The logic zero signal stored in location 23 of memory 380 defines outgoing control channel 23 as idle. Marking control circuit 340 also transmits the character '01' via paths MCC2 and MCC3 to the DATA IN ports of memories 365 and 370 for storage therein. The character '01' stored in location 7 in memory 365 represents the circuit disconnect status signal to be transmitted in outgoing control channel 7 to the originating time-slot interchange unit and its associated control unit. The character '01' stored in location 23 of memory 370 represents the circuit disconnect status signal to be transmitted in outgoing control channel 23 to the destination time-slot interchange unit and its associated control unit. The character '01' stored in memory 365 location 7 is inserted via latch 389 in status field R2 during the next occurrence of outgoing control channel 7 on path 307 and the character '01' stored in memory 370 location 23 is inserted via latch 389 in status field R3 during the next occurrence of outgoing control channel 23 on line 307. Recall that by receiving the circuit disconnect status signal, the control unit associated with the destination time-slot interchange unit is informed that a complete control message has been received for processing.

If the originating time-slot interchange unit, rather than completing the transmission of a control message, desires to prematurely terminate the control message transmission, it transmits a circuit clear request control word, defined as such by having its definition field X2=10, in incoming control channel 7. That circuit clear request control word is stored in latch 321 and, as a result of the transmission of field X2 to decoder 322, decoder 322 transmits a logic one signal on a conductor CCRCW to an input terminal of an AND gate 325. Latch 356 operating in a manner similar to the above-described operation in response to a circuit disconnect request control word, transmits a logic one signal, indicating the active status of incoming control channel 7, via conductor BB to the other input terminal of AND gate 325. In response thereto, AND gate 325 transmits a logic one signal on a conductor Z. The logic one signal on conductor Z results in logic one memory write signals being transmitted on conductors W1 and W2 and in the selection of memory 355 location 7, memory 365 location 7, memory 370 location 23 and memory 380 location 2 as the memory locations to be written into. In response to the logic one signal on conductor Z, marking control circuit 340 transmits logic zero signals on conductors MCC1 and MCC4 (FIG. 19) for storage in memory 355 location 7 and memory 380 location 23, respectively, thereby defining both incoming control channel 7 and outgoing control channel 23 as idle. Marking control circuit 340 transmits the character '00' via paths MCC2 and MCC3 to the DATA IN ports of memories 365 and 370 for storage therein. The character '00' stored in location 7 of memory 365 represents the circuit clear status signal to be transmitted in outgoing control channel 7 to the originating time-slot interchange unit and its associated control unit. The character '00' stored in location 23 of memory 370 represents the circuit clear status signal to be transmitted in outgoing control channel 23 to the destination time-slot interchange unit and its associated control unit. The character '00' stored in memory 365 location 7 is inserted via latch 389 in status field R2 during the next occurrence of outgoing control channel 7 on path 307 and the character '00' stored in memory 370 location 23 is inserted via latch 389 in status field R3 during the next occurrence of outgoing control channel 23 on path 307. Recall that by receiving the circuit clear status signal, the control unit associated with the destination time-slot interchange unit is informed that control message control words have been received.

Figure 20:
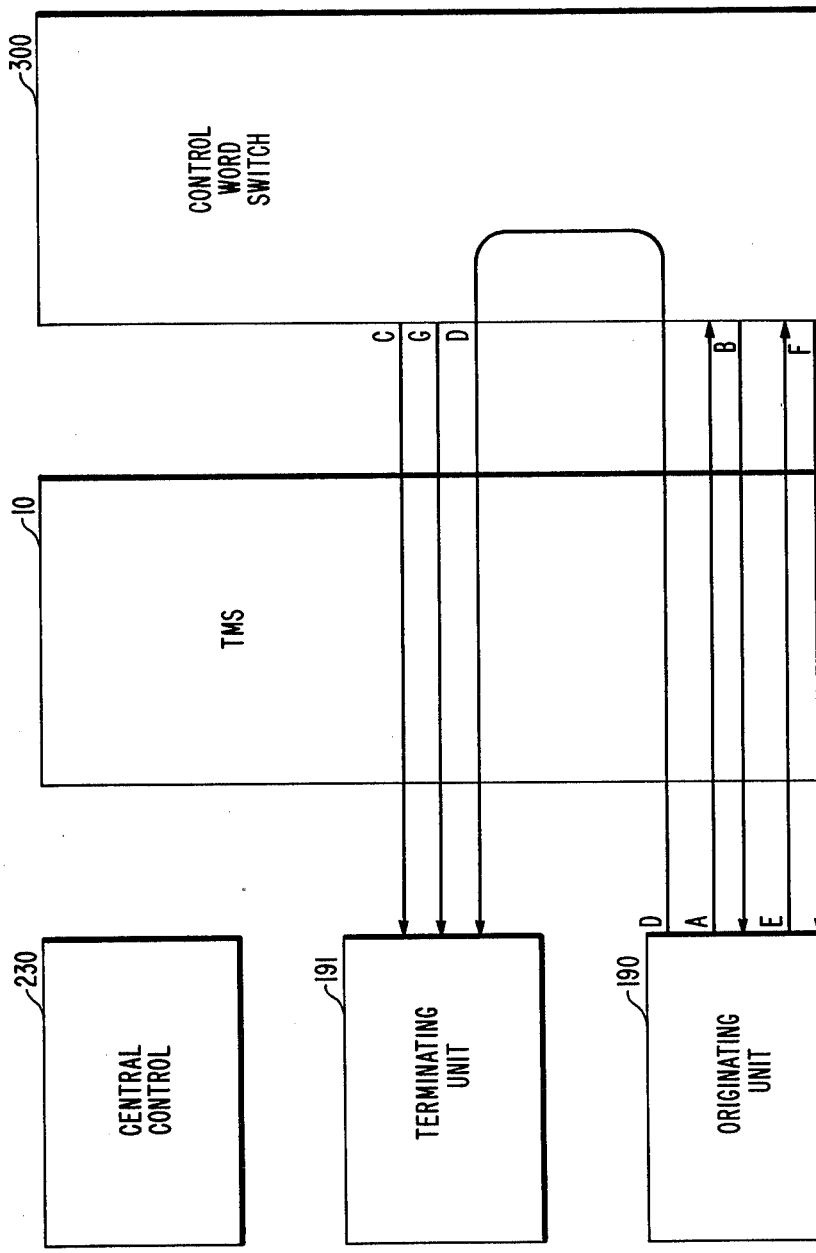
FIG. 20 is a functional diagram of the communication sequence for the transmission of a control message in the embodiment of FIG. 1.

FIG. 20 is a functional diagram illustrating the transmission of a control message from a first control unit to a second control unit in accordance with the primary mode of control information communication disclosed herein. In FIG. 20 originating unit 190 represents originating subscriber set 23, line unit 19, time-slot interchange unit 11, and control unit 17. Similarly, terminating unit 191 represents terminating subscriber set 26, line unit 22, time-slot interchange unit 12, and control unit 18. In the course of the following description, control time slots from a given control unit (or central control 230) are referred to as transmit control time slots while control time slots to a given control unit (or central control 230) are referred to as receive control time slots. Each communication in the control message transmission sequence is represented in FIG. 20 by a line, terminating with an arrowhead to indicate its direction, having an associated letter (A) through (G). The letters (A) through (G) are used to identify the particular communication being discussed. Assume that control unit 17 of originating unit 190 needs to transmit a control message to control unit 18 of terminating unit 191. First originating unit 190 transmits a circuit setup request control word (A) in transmit control time slot TS 1 via time-multiplexed switch 10 to control word switch 300. The circuit setup request control word includes in its information field X1 an address defining outgoing control channel 61 as the control channel to be used for communication to terminating unit 191. Control word switch 300 determines, in response to the circuit setup request control word, the availability of outgoing control channel 61. If outgoing control channel 61 is idle, control word switch 300 stores the address defining outgoing control channel 61 in a memory location associated with incoming control channel 1, transmits a circuit set status signal (B) in outgoing control channel 1 via time-multiplexed switch 10 to originating unit 190 and transmits a circuit set status signal (C) in outgoing control channel 61 via time-multiplexed switch 10 to terminating unit 191. (Although not shown in FIG. 20, if outgoing control channel 61 is busy, control word switch 300 transmits a circuit busy status signal in outgoing control channel 1 via time-multiplexed switch 10 to originating unit 190, and outgoing unit 190 repetitively transmits the circuit setup request control word until receiving a circuit set status signal.) The circuit set status signal (C) received in receive control time slot TS 61 informs control unit 18 of an upcoming control message. In response to the circuit set status signal (B) received in receive control time slot TS 1, originating unit 190 transmits the control message (D) by transmitting one control message control word per frame in transmit control time slot TS 1 via time-multiplexed switch 10 to control word switch 300, each control message control word received by control word switch 300 being routed in outgoing control channel 61 via time-multiplexed switch 10 to terminating unit 191. Once all of the control message control words of the control message have been transmitted, originating unit 190 transmits a circuit disconnect request control word (E) in transmit control time slot TS 1 via time-multiplexed switch 10 to control word switch 300. In response, control word switch 300 transmits a circuit disconnect status signal (F) in outgoing control channel 1 via time-multiplexed switch 10 to originating unit 190 and transmits a circuit disconnect status signal (G) in outgoing control channel 61 via time-multiplexed switch 10 to terminating unit 191. The circuit disconnect status signal (F) informs originating unit 190 that transmit control time slot TS 1 can now be used to transmit another control message. The circuit disconnect status signal (G) informs terminating unit 191 that a complete control message has been transmitted. (Although not illustrated in FIG. 20, originating unit 190 can prematurely terminate the control message transmission by transmitting a circuit clear request control word, rather than a circuit disconnect request control word, to control word switch 300 in which case control word switch 300 then transmits circuit clear status signals to originating unit 190 and terminating unit 191. Terminating unit 191 is informed by the circuit clear status signal that the control message control words which have been received are to be disregarded.) The transmission of a control message from originating unit 190 to central control 230 or from central control 230 to terminating unit 191 is completed using a substantially identical communication sequence. The use of control messages for the establishment of a communication path between subscriber sets 23 and 26 is illustrated by the example described in the above-cited Beuscher U.S. Pat. No. 4,332,843.

It is to be understood that the above-described embodiment is merely illustrative of the principles of the invention and that other arrangements may be devised by those skilled in the art without departing from the spirit and scope of the invention. For example, the time-multiplexed switch in a given embodiment could have the same number of input/output port pairs as the number of channels of the control word switch, e.g., 256. In that case, however, one time-multiplexed switch input-/output port pair must remain unused for each control channel used for the central control.

What is claimed is:

1. A control information communication arrangement for a time division switching system comprising
   switching means comprising input ports and output ports and
   a plurality of control units each connected to at least one of said input ports for transmitting circuit setup request control words each comprising an address portion defining one of said control units and for sequentially transmitting control message control words and each of said control units being connected to at least one of said output ports for receiving control message control words,
   wherein said switching means further comprises control word routing means and
   means for transmitting circuit setup request control words and sequentially transmitting control message control words from the ones of said input ports connected to said control units to said control word routing means and
   wherein said control word routing means comprises means for receiving circuit setup request control words and control message control words and means responsive to a circuit setup request control word from a given input port for transmitting each control message control word received sequentially from that given input port, to one of said output ports connected to the control unit defined by the address portion of that circuit setup request control word before the receipt by said control word routing means of the next control message control word from that given input port.

2. A control information communication arrangement for a time division switching system in accordance with claim 1 wherein said control word routing means further comprises means responsive to a circuit setup request control word from a given input port connected to a given control unit for transmitting a circuit busy status signal to one of said output ports connected to that given control unit when control message control words are being transmitted to one of said output ports connected to the control unit defined by the address portion of that circuit setup request control word.

3. A control information communication arrangement for a time division switching system in accordance with claim 2 wherein each of said plurality of control units further comprises means responsive to said circuit busy status signal for transmitting a circuit setup request control word.

4. A control information communication arrangement for a time division switching system in accordance with claim 1 wherein each of said plurality of control units further comprises
   control means for repetitively transmitting circuit setup request control words and means responsive to a circuit set status signal from said control word routing means for inhibiting the transmission of circuit setup request control words from said control means and for initiating the transmission of control message control words and
   wherein said control word routing means further comprises means responsive to a circuit setup request control word from a given input port connected to a given control unit for transmitting said circuit set status signal to one of said output ports connected to that given control unit when no control message control words are being transmitted to one of said output ports connected to the control unit defined by the address portion of that circuit setup request control word.

5. A control information communication arrangement for a time division switching system in accordance with claim 1
   wherein each of said plurality of control units further comprises means for transmitting circuit disconnect request control words after all of the control message control words comprising a control message have been transmitted and
   wherein said control word routing means further comprises means responsive to a circuit disconnect request control word from a given input port connected to a given control unit after having received a circuit setup request control word from that given input port for transmitting a circuit disconnect status signal, indicating the transmission of a complete control message, to one of the output ports connected to the control unit defined by the address portion of that circuit setup request control word.

6. A control information communication arrangement for a time division switching system in accordance with claim 5 wherein each of said plurality of control units further comprises means responsive to said circuit disconnect status signal for processing a received control message.

7. A control information communication arrangement for a time division switching system in accordance with claim 1 wherein each of said plurality of control units further comprises means for transmitting circuit clear request control words and wherein said control word routing means further comprises means responsive to a circuit clear request control word from a given input port connected to a given control unit after having received a circuit setup request control word from that given input port for transmitting a circuit clear status signal, indicating the transmission of control message control words to be disregarded, to one of the output ports connected to the control unit defined by the address portion of that circuit setup request control word.

8. A control information communication arrangement for a time division switching system in accordance with claim 7 wherein each of said plurality of control units further comprises means responsive to said circuit clear status signal for disregarding received control message control words.

9. A control information communication arrangement for a time division switching system in accordance with claims 1, 2, 3, 4, 5, 6, 7 or 8 wherein at least one of said plurality of control units comprises a central control for controlling said switching means.

10. A control information communication arrangement for a time division switching system in accordance with claims 1, 2, 3, 4, 5, 6, 7 or 8 further comprising a plurality of data word sources each connected to at least one of said input ports for transmitting data words and a plurality of data word receivers each connected to at least one of said outport ports for receiving data words and wherein said switching means further comprises means for selectively transmitting data words from the input ports connected to said data word sources to predetermined ones of said output ports connected to said data word receivers.

11. A control information communication arrangement for a time division switching system in accordance with claim 10 further comprising a plurality of first time-multiplexed lines each comprising a recurring series of time slots connected to one of said input ports, a plurality of second time-multiplexed lines each comprising a recurring series of time slots connected to one of said output ports, wherein said data word sources comprises means for transmitting data words during predetermined ones of the time slots on said first time-multiplexed lines, wherein said data word receivers comprise means for receiving data words during predetermined ones of the time slots on said second time-multiplexed lines, and wherein said control units comprise means for transmitting circuit setup request control words and control message control words on said first time-multiplexed lines during transmit control time slots which comprise particular ones of said time slots not used by said data word sources for transmitting data words and means for receiving control message control words on said second time-multiplexed lines during receive control time slots which comprise particular ones of said time slots not used by said data word receivers for receiving said data words.

12. A control information communication arrangement for a time division switching system in accordance with claim 10 wherein at least one of said plurality of control units comprises a central control for controlling said switching means.

13. A switching system comprising switching means having a plurality of input ports and a plurality of output ports for completing communication paths between said input ports and said output ports in time slots of fixed duration, a plurality of communication units each connected to predetermined ones of said input ports for transmitting control words during transmit control time slots which comprise predetermined ones of the time slots at those input ports and each connected to predetermined ones of said output ports for receiving control words during receive control time slots which comprise predetermined ones of the time slots at those outputs ports, said switching means further comprising control word switch means comprising means for receiving control words at said input ports during said transmit control time slots, means for transmitting control words from said output ports during said receive control time slots and a plurality of transmit storage means each associated with one of said transmit control time slots, each of said plurality of communication units further comprising means for transmitting during transmit control time slots, circuit setup request control words including an address portion defining one of said receive control time slots and means for transmitting during transmit control time slots control message control words and said control word switch means further comprising means responsive to a given circuit setup request control word received in a given transmit control time slot for storing in the transmit storage means associated with said given transmit control time slot the address portion of said given circuit setup request control word and means responsive to each control message control word received in said given transmit control time slot for transmitting that control message control word during a predetermined occurrence of the receive control time slot defined by the address portion stored in the transmit storage means associated with said given transmit control time slot.

14. A switching system comprising switching means having a plurality of input ports and a plurality of output ports for completing communication paths between said input ports and said output ports in time slots of fixed duration, a plurality of communication units each connected to predetermined ones of said input ports for transmitting control words during transmit control time slots which comprise predetermined ones of the time slots at those input ports and each connected to predetermined ones of said output ports for receiving control words during receive control time slots which comprise predetermined ones of the time slots at those output ports, said switching means further comprising control word switch means comprising means for receiving control words at said input ports during said transmit control time slots, means for transmitting control words from said output ports during said receive control time slots, a plurality of transmit storage means each associated with one of said transmit control time slots and a plurality of receive storage means each associated with one of said receive control time slots comprising means for storing a busy/idle status indicator for that receive control time slot, each of said plurality of communication units further comprising means for transmitting during transmit control time slots, circuit setup request control words including an address portion defining one of said receive control time slots, said control word switch means further comprising means responsive to a given circuit setup request control word received in a given transmit control time slot at a given input port connected to a given communication unit, whe the busy/idle status indicator stored in the receive storage means associated with the receive control time slot defined by the address portion of said given circuit setup request control word indicates an idle status of that receive control time slot, for storing in the transmit storage means associated with that given transmit control time slot said address portion of said given circuit setup request control word, for changing said last-mentioned busy/idle status indicator to indicate a busy status and for transmitting a circuit setup status signal in a receive control time slot from one of said output ports connected to said given communication unit, each of said plurality of communication units further comprising means responsive to a circuit setup status signal received in a given receive control time slot at an output port connected to that communication unit for transmitting in transmit control time slots at one of the input ports connected to that communication unit control message control words and said control word switch means further comprising means for transmitting each control message control word received in a given transmit control time slot, in the receive control time slot defined by the address portion stored in the transmit storage means associated with that given transmit control time slot.

15. A switching system in accordance with claims 13 or 14 wherein at least one of said plurality of communication units comprises a central control for controlling said switching means.

16. An arrangement comprising
first transmitter means for transmitting control message control words in at least one channel of a plurality of channels of a first time-multiplexed line,
receiver means for receiving control message control words in said at least one channel of said plurality of channels of said first time-multiplexed line,
a first plurality of memory locations each associated with one of said plurality of channels of said first time-multiplexed line for storing an address defining one of a plurality of channels of a second time-multiplexed line, each of said plurality of channels of said second time-multiplexed line corresponding to one of said plurality of channels of said first time-multiplexed line,
a second plurality of memory locations each associated with one of said plurality of channels of said second time-multiplexed line for storing a busy/idle status indicator representing the busy/idle status of that channel of said second time-multiplexed line,
second transmitter means for transmitting each control message control word received in one of said plurality of channels of said first time-multiplexed line, during a predetermined occurrence of the channel of said second time-multiplexed line defined by the address stored by the one of said first plurality of memory locations associated with that channel of said first time-multiplexed line,
wherein said first transmitter means further comprises means for transmitting circuit setup request control word including an address defining one of said plurality of channels of said second time-multiplexed line,
wherein said receiver means further comprises means responsive to a given circuit setup request control word received in a given channel of said first time-multiplexed line for transmitting the address included in said given circuit setup request control word to the one of said first plurality of memory locations associated with said given channel of said first time-multiplexed line for storage therein and
wherein said second transmitter means further comprises means for transmitting in the channel of said second time-multiplexed line corresponding to said given channel of said first time-multiplexed line a predefined status signal when the busy/idle status indicator stored in the one of said second plurality of memory locations associated with the one of said plurality of channels of said second time-multiplexed line defined by the address included in said given circuit setup request control word represents an idle status.

17. An arrangement in accordance with claim 16 wherein said first transmitter means further comprises means for transmitting control message control words in said given channel of said first time-multiplexed line only after said second transmitter means has transmitted said predefined status signal.

18. An arrangement in accordance with claim 16 wherein said first transmitter means further comprises
status signal receiver means for receiving said predefined status signal and
means for transmitting control message control words in said given channel of said first time-multiplexed lines only after said status signal receiver means has received said predefined status signal.

19. A distributed control switching system comprising
a switching means and
first and second control units for controlling said system each coupled for communication with said switching means by a link associated with that control unit,
wherein said first control unit further comprises means for repetitively transmitting circuit setup request control words defining said second control unit until receiving a predefined status signal from said switching means,
wherein said switching means comprises means responsive to said circuit setup request control words for determining the availability of the link associated with said second control unit for communication from said switching means to said second control unit and means responsive to said circuit setup request control words when the link associated with said second control unit is available for communication from said switching means to said second control unit, for coupling the links associated with said first and second control units for communication from said first control unit to said second control unit and for transmitting said predefined status signal to said first control unit and wherein said first control unit further comprises means for transmitting a control message in response to said predefined status signal.

20. A distributed control switching system in accordance with claim 19 wherein said first control unit further comprises means for transmitting a circuit disconnect request control word after the transmission of said control message and wherein said switching means further comprises means responsive to said circuit disconnect request control word for transmitting a circuit disconnect status signal, indicating the transmission of a complete control message, on the link associated with said second control unit.

21. A distributed control switching system in accordance with claim 19 wherein said first control unit further comprises means for transmitting a circuit clear request control word and wherein said switching means further comprises means responsive to said circuit clear request control word for transmitting a circuit clear status signal indicating the transmission of a control message to be disregarded, on the link associated with said second control unit.

22. In a distributed control switching system comprising a switching means and a plurality of control units for controlling said system each coupled for communication with said switching means by a link associated with that control unit, a method of communicating a control message from a first control unit to a second control unit comprising repetitively transmitting, by said first control unit, circuit setup request control words defining said second control unit until receiving a predefined status signal from said switching means, determining, by said switching means in response to said circuit setup request control words, the availability of the link associated with said second control unit for communication from said switching means to said second control unit, coupling, by said switching means, the links associated with said first and second control units for communication from said first control unit to said second control unit and transmitting, by said switching means, said predefined status signal to said first control unit, both in response to said circuit setup request control words when the link associated with said second control unit is available for communication from said switching means to said second control unit and transmitting, by said first control unit, said control message in response to said predefined status signal.

23. A method in accordance with claim 22 further comprising transmitting, by said first control unit, a circuit disconnect request control word after the transmission of said control message and transmitting, by said switching means in response to said circuit disconnect request control word, a circuit disconnect status signal, indicating the transmission of a complete control message, on the link associated with said second control unit.

24. A method in accordance with claim 22 further comprising transmitting, by said first control unit, a circuit clear request control word and transmitting, by said switching means in response to said circuit clear request control word, a circuit clear status signal, indicating the transmission of a control message to be disregarded, on the link associated with said second control unit.

* * * * *